(12) United States Patent
Zhu et al.

(10) Patent No.: US 11,360,491 B2
(45) Date of Patent: Jun. 14, 2022

(54) LOSS-OF-CONTROL PREVENTION AND RECOVERY FLIGHT CONTROLLER

(71) Applicant: Ohio University, Athens, OH (US)

(72) Inventors: Jianchao Zhu, Athens, OH (US); Yue Zhao, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 15/927,482

(22) Filed: Mar. 21, 2018

(65) Prior Publication Data

US 2018/0267560 A1 Sep. 20, 2018

Related U.S. Application Data

(63) Continuation of application No. PCT/US2016/053030, filed on Sep. 22, 2016.

(60) Provisional application No. 62/221,858, filed on Sep. 22, 2015.

(51) Int. Cl.
| | |
|---|---|
| *G05D 1/10* | (2006.01) |
| *G05D 1/08* | (2006.01) |
| *B64C 19/00* | (2006.01) |
| *G05D 1/00* | (2006.01) |
| *G05D 1/04* | (2006.01) |

(52) U.S. Cl.
CPC ............ *G05D 1/101* (2013.01); *B64C 19/00* (2013.01); *G05D 1/0072* (2013.01); *G05D 1/042* (2013.01); *G05D 1/0808* (2013.01); *G05D 1/0816* (2013.01)

(58) Field of Classification Search
CPC .... G05D 1/0212; G05D 1/0088; G05D 1/101; G05D 1/0038; G05D 1/0072; G05D 1/042; G05D 1/0808; G05D 1/0816; G05D 1/00–1/12; G05D 1/0615; B64C 19/00; B64C 13/16; B64C 1/26; B64C 3/00; B64C 5/00; B64C 5/08; G01C 23/00; B64B 1/12; B64B 1/20
USPC .......................................................... 701/12
See application file for complete search history.

(56) References Cited

U.S. PATENT DOCUMENTS

| | | | |
|---|---|---|---|
| 4,212,443 A | 7/1980 | Duncan et al. | |
| 5,062,594 A * | 11/1991 | Repperger | ............ B64C 13/507 244/175 |
| 5,079,711 A * | 1/1992 | Lambregts | ........... G05D 1/0638 244/181 |

(Continued)

OTHER PUBLICATIONS

U.S. Patent and Trademark Office, Search Report and Written Opinion in PCT Application No. PCT/US2016/053030, dated Dec. 15, 2016, 11 pages.

(Continued)

*Primary Examiner* — Fadey S. Jabr
*Assistant Examiner* — Mohamed Abdo Algehaim
(74) *Attorney, Agent, or Firm* — Wood Herron & Evans LLP

(57) ABSTRACT

A loss-of-control prevention and recovery automatic control system of an aircraft is provided having a plurality of flight control mode, including a nominal flight control mode, a loss-of-control prevention control mode, a loss-of-control arrest control mode, and a nominal flight restoration control mode, as well as a supervisory control system capable of monitoring the flight states and flight events of the aircraft and determining which flight control mode to activate.

17 Claims, 13 Drawing Sheets

(56) References Cited

U.S. PATENT DOCUMENTS

| | | | | |
|---|---|---|---|---|
| 5,983,161 | A * | 11/1999 | Lemelson | G01S 19/11 340/436 |
| 6,122,572 | A * | 9/2000 | Yavnai | G05D 1/0088 342/13 |
| 6,138,060 | A * | 10/2000 | Conner | G01C 5/005 701/9 |
| 8,437,890 | B2 * | 5/2013 | Anderson | B60W 30/09 701/3 |
| 8,761,966 | B2 * | 6/2014 | Zhu | G05D 1/101 244/175 |
| 10,315,778 | B2 * | 6/2019 | Holder | B64D 45/00 |
| 2005/0230566 | A1 * | 10/2005 | A'Harrah | B64C 13/10 244/223 |
| 2009/0157239 | A1 * | 6/2009 | Walton | B64C 13/16 701/6 |
| 2011/0043786 | A1 | 2/2011 | Lacondemine et al. | |
| 2011/0251740 | A1 * | 10/2011 | Gomez Ledesma | G05D 1/101 701/8 |
| 2011/0305568 | A1 * | 12/2011 | Brath | F03D 7/046 416/1 |
| 2012/0083947 | A1 * | 4/2012 | Anderson | B60W 30/09 701/3 |
| 2012/0095621 | A1 * | 4/2012 | Zhu | G05D 1/101 701/3 |
| 2013/0041527 | A1 * | 2/2013 | Sowers | F42B 10/64 701/3 |
| 2013/0080043 | A1 * | 3/2013 | Ballin | G08G 5/0078 701/120 |
| 2013/0112804 | A1 * | 5/2013 | Zhu | B64C 29/0025 244/2 |
| 2014/0046510 | A1 * | 2/2014 | Randolph | G01P 13/045 701/14 |
| 2014/0214243 | A1 * | 7/2014 | Whitehead | G05D 1/104 701/3 |
| 2014/0303884 | A1 * | 10/2014 | Levien | G08G 5/04 701/301 |
| 2014/0371957 | A1 * | 12/2014 | Riedinger | B64D 43/02 701/3 |
| 2015/0129716 | A1 * | 5/2015 | Yoffe | B64F 1/02 244/110 C |
| 2015/0183510 | A1 | 7/2015 | Vander Lind et al. | |
| 2015/0197335 | A1 | 7/2015 | Dekel et al. | |
| 2015/0226575 | A1 * | 8/2015 | Rambo | B64C 39/024 701/523 |
| 2016/0179097 | A1 * | 6/2016 | Chua | B64C 13/18 701/2 |
| 2017/0356925 | A1 * | 12/2017 | Berdoulat | B64D 43/00 |

OTHER PUBLICATIONS

The International Bureau of WIPO, International Preliminary Report on Patentability in PCT Application No. PCT/US2016/053030, dated Mar. 27, 2018, 8 pages.

* cited by examiner

LOSS-OF-CONTROL PREVENTION AND RECOVERY FLIGHT CONTROLLER

CROSS-REFERENCE TO RELATED APPLICATION

This application is a continuation of and claims priority to PCT Application No. PCT/US2016/053030, filed on Sep. 22, 2016, which claims priority to U.S. Provisional Patent Application Ser. No. 62/221,858, filed on Sep. 22, 2015, the disclosures of which are incorporated by reference herein in their entireties.

TECHNICAL FIELD

The present invention relates generally to a flight control system for fixed-wing aircraft, and more specifically a hybrid flight control system for loss-of-control prevention and recovery.

BACKGROUND

There are three types of forces acting on an airplane simultaneously: the aerodynamic force, the gravitational force, and the propulsion. The aerodynamic force has three components: lift force, drag force, and side force. These forces are generated by the relative motion of the airfoil with respect to the atmosphere. Since dependencies of aerodynamic forces are usually very complex, approximations are made to determine the aerodynamic force by aerodynamic angles including angle-of-attack, side-slip angle, and bank angle.

Angle-of-attack can be defined as the angle between the wing airfoil chord line and the relative wind. In normal operations, the lift is directly proportional to angle-of-attack. However, angle-of-attack cannot exceed an upper bound which is called the critical angle-of-attack, since beyond it flow separation induced stall may occur causing sudden reduction of the lift. In the situation of the stall, the airplane will lose altitude and the ability to control its attitude. The side-slip angle is the angle between the oncoming airflow and the direction towards which the aircraft is pointing. Similar to the angle-of-attack, side-slip angle determines the magnitude of side force. The large side-slip angle may cause severe vibration of propellers or surge in turbo-engines, which may lead to Loss-of-Control ("LOC") or cause damage to the vehicle. Large side-slip angles combined with a stall may induce lateral spins of the aircraft which may not be recoverable. Side slipping is undesirable since a lateral acceleration directed toward the airplane center makes passengers uncomfortable. Bank angle is the angle of the vehicle longitudinal axis inclines with respect to its velocity vector. It is a preferred maneuver in carrying out a turn, known as a Bank-to-Turn (BTT). If the vehicle is over-banked, it may lose altitude and go into a spiral dive due to inadequate lift. Therefore, the pilot or autopilot would lose the ability to fix the aircraft with the aerodynamic angles exceeding the safety boundaries, causing the vehicle to go into LOC. Here LOC means that the pilot would not be able to operate the plane, even though the control system of the aircraft may still be physically intact and functional.

Based on the Airplane Upset Recovery Training Aid provided by the Federal Aviation Administration (FAA), "an airplane in flight unintentionally exceeding the parameters normally experienced in operations or training" is called airplane upset. LOC is described as motions that are: 1) outside the normal operating flight envelopes; 2) not predictably controlled by pilot inputs; 3) high angular rates and displacements. Statistics of airplane accidents show that aircraft LOC were associated with aircraft component failures (including jammed control surfaces, loss of engines, icing contamination), weather conditions (including turbulence, wind shear, mountain waves), and inappropriate crew control. The analysis also shows that the LOC accidents usually involve more than one contributing factor and consequently drive the aircraft into an inadvertent event with abnormal aircraft attitude, angular rate, acceleration, airspeed, or flight trajectory.

According to the statistical report of commercial jet accidents occurring from 2003 through 2012 created by the Boeing Company, LOC-in-flight was the number one cause in terms of both the number of accidents and the number of fatalities. There were 18 accidents and 1,648 deaths caused by LOC during that period. Moreover, not only for commercial transport airplanes, LOC is listed to be the number one cause of upset events also for general aviation.

Thus, the Commercial Aviation Safety Team (CAST) has spearheaded the effort to define the causes of LOC and to develop interventions to prevent these accidents. Even though the automatic flight control system (autopilot) is usually equipped in modern aircraft operation systems to reduce the pilot's workload, the FAA upset recovery rules still require that the pilot needs to take control of the aircraft when LOC occurs. Several pilot training programs provide simulators to educate pilots so that they will have adequate skills to prevent and recover from upsets. Because pilot recovery depends on the pilot response time and may involve inappropriate operations due to human errors, it would be beneficial to develop effective interventions by designing an automatic system that has the capabilities of correctly and promptly responding to unanticipated events and recover from adverse LOC situations.

The chain of complex events that cause LOC and proper interventions can be subdivided into nominal, prevention, LOC arrest, and mission restoration. Prevention is defined to be the control strategies and maneuvers to sustain normal flight under unexpected adverse events such as environmental hazards, system failures, vehicle damage, or pilot errors. In the event that prevention fails and the aircraft still slips into upset situations, then LOC arrest becomes necessary, which is to activate control strategies to rescue the aircraft from a LOC event. A stabilized flight path recovery should be initiated as soon as LOC arrest maneuvers are complete, which is the restoration. LOC arrest and restoration will eventually achieve full flight mission recovery.

In the past, small wind disturbance accommodation has been considered in the aircraft control system design, but advanced aircraft control method should be applied for control system design to improve the robustness so that the aircraft can survive severe weather conditions. Given different LOC events (for example, a jammed actuator or stuck control surface), the existing LOC prevention methods focus on the computations of the safe set, especially in control constraints design of the flight control systems. However, it is difficult to anticipate all different adverse operating scenarios in the automatic control systems since the LOC occurs due to a combination of various factors, and detecting an impending LOC mode in real-time during an upset can be very challenging. In one study, up to 700 feet altitude loss occurred by linearized natural damping recovery for the aerodynamic envelopes. Such LOC recovery is more likely to experience a crash considering the terrain, especially during approach and landing. Such performance would not be considered an effective LOC recovery by the Pilot Guide to Airplane Upset Recovery, which requires that the altitude loss must be within 30 m (100 feet).

Various control methods have been used striving to provide passengers with a smooth ride and high degree of safety. Order-reduction, decoupling, linearization and frozen time techniques are commonly used to develop the control system for LOC prevention and recovery. However, flight control systems are designed typically for nominal aircraft Equation-of-Motions (EOMs), which are invalid under upset conditions. In addition, such methods provide limited capabilities because the effectiveness or even stability of such designs relies heavily on the simplification assumptions pertaining to the specific LOC mode and aircraft models. In addition, perturbations caused by order-reduction (singular perturbation), decoupling (regular perturbation), linearization (vanishing regular perturbation), and/or frozen time (non-vanishing regular perturbation) have typically been neglected during design relying on the stability margins to accommodate. In that case, the adequate stability margin and load/stress factors have not been given adequate attention in the controller design due to changes in the aircraft dynamics, possible excitation of un-modeled parasitic dynamics and parameter change by the upset. Furthermore, pilot LOC training requires the disengagement of autopilot when aircraft experiences upset, which clearly indicates the deficiencies and immaturity of the current automatic flight control systems in LOC recovery.

Therefore, significant improvements to the current LOC prevention and recovery performance by the existing techniques could be achieved with more advanced control techniques. There is a need for a more intelligent and reliable automatic LOC prevention and recovery system to supplement the pilot operation or even substitute for the pilot to control the aircraft in an upset condition.

SUMMARY

An integrated loss-of-control prevention and recovery automatic control system of a fixed-wing aircraft is disclosed. The control system includes a plurality of flight control modes, including a nominal flight control mode, a loss-of-control prevention control mode, a loss-of-control arrest control mode, and a nominal flight restoration control mode. The control system further includes a supervisory control system capable of monitoring the flight states and flight events of the aircraft and determining which flight control mode to activate. In one aspect of the control system, the nominal flight control mode is defined by a six degree-of-freedom trajectory tracking controller with the wind-triangle and the post-stall aerodynamic characteristics in the calculation of the aerodynamic forces, and the time-varying parallel differential eigenvalues implemented in the feedback control gain matrices per Eqs. (9)-(11) below. In another aspect of the control system, the loss-of-control prevention control mode includes a bandwidth adaptation to the nominal flight control mode to prevent a loss of control of the aircraft. In another aspect of the control system the loss-of control prevention control mode employs time-varying parallel differential eigenvalues to sacrifice tracking performance to increase capability of tolerance for severe wind and other abnormalities in real-time. In yet another aspect of the control system, wherein the loss-of-control prevention control mode augments the six degree-of-freedom trajectory tracking controller in the nominal flight control mode via the gain matrices per Eqs. (9)-(11) below. In another aspect of the control system, the loss-of-control arrest control mode includes a full throttle control during an arrest phase. In still another aspect of the control system, the loss-of-control arrest control mode includes a commanded aerodynamic attitude determined by a level and straight flight trim value of angle-of-attack and zero sideslip and bank angles. The loss-of-control arrest control mode may track the commanded aerodynamic profile via inner and outer aerodynamic attitude loops.

In another aspect of the control system, the restoration mode includes a close-in sub-mode for guiding the aircraft to catch up with a target position dictated by a mission trajectory and a home-in sub-mode for restoring the mission trajectory of the aircraft. The close-in sub-mode may be defined by a guidance approach wherein a velocity vector of the aircraft is aligned to a line-of-sight vector of the aircraft using proportional-integral-derivative linear regulation in an Earth reference frame. The home-in sub-mode may include a bandwidth adaptation for gradually regaining tracking performance of the aircraft and restoring the mission trajectory of the aircraft.

In another aspect of the control system, the supervisory control system includes a supervisory control logic variable having a value set according to flight states and flight events of the aircraft, and determining which flight control mode to activate. The supervisory control logic variable may be set to a value corresponding to the nominal flight control mode when a predetermined set of flight states of the aircraft are each within a predetermined set of operation thresholds. The supervisory control logic variable may be set to a value corresponding to the loss-of-control prevention control mode when at least one the flight states of the aircraft is within a predetermined set of protection thresholds. The supervisory control logic variable may be set to a value corresponding to the loss-of-control arrest control mode when at least one the flight states of the aircraft exceeds a predetermined set of safety thresholds. The supervisory control logic variable may be set to a value corresponding to the nominal flight restoration control mode when a predetermined set of flight states of the aircraft are each within a predetermined set of operation thresholds and a position error between the aircraft and a target position exceeds a range threshold.

A method of preventing loss-of-control of a fixed-wing aircraft having an automatic control system is also disclosed, The method includes monitoring a plurality of flight states of the aircraft, engaging a nominal flight control mode of the automatic control system when a predetermined set of flight states of the aircraft are each within a predetermined set of operation thresholds, engaging a prevention mode of the automatic control system when at least one of the flight states of the aircraft is within a predetermined set of protection thresholds, and engaging a loss-of-control arrest mode of the automatic control system when at least one the flight states of the aircraft exceeds a predetermined set of safety thresholds. In one aspect of the method, it further includes engaging a restoration mode of the automatic control system when a predetermined set of flight states of the aircraft are each within a predetermined set of operation thresholds and a position error between the aircraft and a target position exceeds a range threshold.

In another embodiment, an integrated loss-of-control prevention and recovery automatic control system of a fixed-wing aircraft is also disclosed. The control system includes a plurality of flight control modes, including a nominal flight control mode and a loss-of-control prevention control mode. The control system also includes a supervisory control system capable of monitoring the flight states and flight events of the aircraft and determining which flight control mode to activate.

In another embodiment, an integrated loss-of-control prevention and recovery automatic control system of a fixed-wing aircraft is disclosed. The control system includes a plurality of flight control modes, including a nominal flight control mode and a loss-of-control arrest control mode. The control system further includes a supervisory control system capable of monitoring the flight states and flight events of the aircraft and determining which flight control mode to activate.

In another embodiment, a restoration mode for a fixed-wing aircraft is disclosed. The control system includes a close-in sub-mode for guiding the aircraft to catch up with a target position, wherein the close-in sub-mode is defined by a guidance approach wherein a velocity vector of the aircraft is aligned to a line-of-sight vector of the aircraft using proportional-integral-derivative linear regulation in an Earth reference frame. The control system further includes a home-in sub-mode for restoring a mission of the aircraft, wherein the home-in sub-mode includes a bandwidth adaptation for gradually regaining tracking performance of the aircraft and restoring the mission trajectory of the aircraft.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

A. Nomenclature

Figure 1:
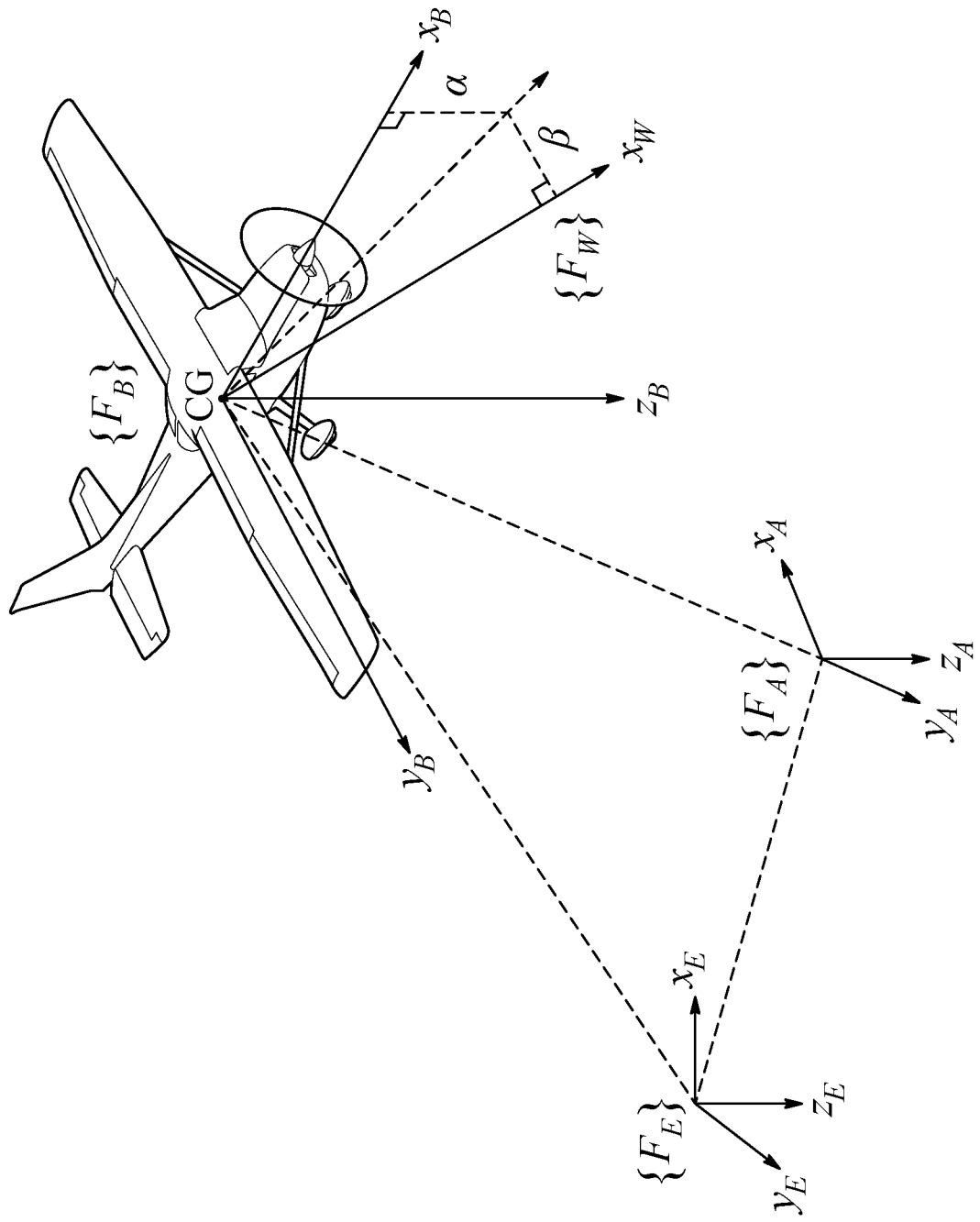
FIG. 1 is a perspective view of an exemplary aircraft, further showing various coordinate frames relative to the aircraft.

The following is a list of the nomenclature used in the detailed description and drawings:

$P = [x_e \ y_e \ z_e]^T$ = vehicle inertial position (m)
$V = [u \ v \ w]^T$ = body frame vehicle velocity (m/s)
$A_b [a_u \ a_v \ a_w]^T$ = body frame acceleration (m/s$^2$)
$V_a = [u_a \ v_a \ w_a]^T$ = body frame wind velocity (m/s)
$V_r = [u_r \ v_r \ w_r]^T$ = body frame relative wind velocity (m/s)
$\Gamma = [\phi \ \theta \ \psi]^T$ = Euler angles: roll, pitch, and yaw (rad)
$\Omega = [p \ q \ r]^T$ = angular rates in the body frame (rad/s)
$\Theta = [a_p \ a_q \ a_r]^T$ = angular acceleration in the body frame (rad/s$^2$)
$\Delta = [\delta_a \ \delta_e \ \delta_r]^T$ = aileron, elevator and rudder deflection (rad)
$F = [F_x \ F_y \ F_z]^T$ = total force on aircraft in the body frame (N)
$F_a = [D \ Y \ L]^T$ = aerodynamic force: drag, side force, and lift in the wind frame (N)
$T_m = [L_m \ M_m \ N_m]^T$ = total torque on aircraft in the body frame (Nm)
$T = [T_x \ T_y \ T_z]^T$ = body frame thrust (N)
$\Lambda = [\alpha \ \beta \ \mu]^T$ = aerodynamic angles: angle-of-attack, sideslip and bank angle (rad)
$R = [R_N \ R_E \ R_D]^T$ = range vector (m)
$LOS = [l_1 \ l_2 \ l_3]^T$ = Line-of-Sight vector
$h = -z_e$ = altitude (m)
$Q$ = dynamic pressure (N/m$^2$)
$\bar{\rho}$ = local atmosphere density (kg/m$^3$)
$V_t$ = magnitude of vehicle velocity (m/s)
$\gamma \chi$ = flight path angle, heading angle (rad)
$\delta_\tau$ = proportional thrust control effector
$T, T_{max}$ = thrust magnitude, maximum thrust magnitude (N)
$V_{t,max}$ = maximum allowable vehicle velocity (m/s)
$W$ = vehicle weight under conventional gravitational acceleration (N)
$m$ = vehicle mass (kg)
$g$ = gravitational acceleration (m/s$^2$)
$S$ = wing reference area (m$^2$)
$b$ = wing span (m)
$\bar{c}$ = wing mean aerodynamic chord (m)
$n$ = load factor
$\rho$ = azimuth angle (rad)
$\sigma$ = elevation angle (rad)
$\bar{r}$ = range vector magnitude
flag = supervisory control flag
$K_P, K_I, K_D$ = proportional, integral and differential gain
$K_V, K_r$ = velocity and range regulation gains $\alpha_{ij1} = \omega_n^2(t)$, where $\omega_n(t)$ is the time-varying natural frequency of desired dynamics for $i^{th}$ loop, i=1, 2, 3, 4, $j^{th}$ channel, i=1, 2, 3, (1=roll channel, 2=pitch channel, 3=yaw channel)

$\alpha_{ij2} = 2\xi\omega_n(t)$, where $\xi$ is the constant damping ratio of desired dynamics for $i^{th}$ loop, $j^{th}$ channel $k_a$=bandwidth adaptation gain P(s)=plant transfer function L(s)=loop gain $\phi$(s)=phase response $\omega_B$=actuator system bandwidth (rad/s)

$\omega_{cg}$=gain cross-over frequency of loop gain (rad/s)

$\varepsilon$=singular perturbation parameter $\omega_n$=natural frequency (rad/s)

$C_{D_0}, C_{D_\alpha}, C_{D_\beta}$=drag force coefficients $C_{Y_\beta}, C_{Y_{\delta r}}$=side force coefficients $C_{L_0}, C_{L_\alpha}, C_{L_{\delta e}}$=lift force coefficients $C_{l_\beta}, C_{l_{\delta a}}, C_{l_{\delta r}}$=roll moment coefficients $C_{m_o}, C_{m_\alpha}, C_{m_{\delta e}}$=pitch moment coefficients $C_{n_\beta}, C_{n_{\delta a}}, C_{n_{\delta r}}$=yaw moment coefficients $I_{xx}, I_{yy}, I_{zz}$=moment of inertia about the body frame axis (kg. m$^2$)

$I_{yz}, I_{xz}, I_{xy}$=products of inertia (kg. m$^2$)

$I_{pq}^p, I_{pp}^q, I_{pq}^r, I_{qr}^p, I_{pr}^q, I_{qr}^r$=inertia coefficients $I_{rr}^q, g_l^p, g_n^p, g_l^r, g_m^q, g_n^r$ $I_x, I_y, I_z, I_{xz}$=moments of inertia $O_1, O_2, O_3$=operation box subset $P_1, P_2, P_3$=protection box subset $S_1, S_2, S_3$=safety box subset $S_x$=sin(x)

$C_x$=cos(x)

$T_x$=tan(x)

B. Reference Frames

The following aircraft coordinate frames are illustrated in FIG. 1.

The Earth-fixed reference frame $F_E$ with flat-Earth assumptions is considered an inertial frame throughout this detailed description. A position vector in this frame is given as P=[$x_E$ $y_E$ $z_E$]$^T$, with positive $x_E$ pointing due north, $y_E$ due east, and $z_E$ toward the center of the Earth. The origin is some fixed point on the Earth's surface P=[0 0 0] that is specified when necessary.

A body-fixed frame of reference $F_B$ is defined with the x-axis pointing forward along and parallel to the fuselage of the aircraft, and the y-axis at 90° along the right (starboard) wing such that the x-z plane is the plane of symmetry of the aircraft. The z-axis points downward to form a right-handed triad. It is assumed that the thrust vector T runs along the x-axis and through the center-of-gravity (cg). A proportional thrust law given by $T_{com} = \delta_\tau T_{max}$ is used for simplicity of exposition, where $\delta_{\tau \in [0,1]}$ denotes the engine throttle setting and is used as a control effector by the guidance control allocation.

The wind frame of reference $F_W$ is defined with the x-axis along the total velocity vector $V_t$ and the y-axis at 90° along the right (starboard) side of the aircraft aligned with the body frame y-axis. The z-axis remains at all times in the aircraft plane of symmetry, and completes a right-handed coordinate system.

A local atmospheric-fixed reference frame $F_A$ describing the motion of the atmosphere with translational and rotational properties has its origin fixed in the air mass surrounding the aircraft and aligns with the Earth Frame when there is no rotational movement.

The equations of motion (EOM) are integrated in the body frame, and the aerodynamic forces and moments may be calculated in either the wind frame or body frame using appropriate aerodynamic coefficients. Using these reference frames leads to the standard EOM for a rigid-body aircraft.

There is also a body-carried Earth reference frame, sometimes called the "local Level Frame" or "local Geodetic Frame," which is to attach the origin of the Earth-fixed frame to the center of gravity of the aircraft without rotations. This frame may be useful in defining the aircraft attitude (orientation).

C. Introductory Overview

The invention provides an autonomous integrated Loss-of-Control Prevention and Recovery (iLOCPR) system capable of acting as a supervisory control to make decisions and coordinate various control modes according to the flight conditions of the aircraft. The iLOCPR system may be characterized by a set of one or more control modes including, for example, a "nominal flight control mode", a "LOC prevention control mode", a "LOC arrest control mode" and a "nominal flight restoration control mode." Generally, the functions of these modes are: (i) a baseline flight controller for 6DOF trajectory tracking as the nominal flight control mode designed by Trajectory Linearization Control (TLC); (ii) a bandwidth adaption augmentation to the baseline controller for LOC prevention control mode using the time-varying Parallel Derivative (PD)-eigenvalues to trade tracking performance for increased stability margin and robustness in the presence of LOC-prone flight conditions; (iii) a controller reconfiguration for LOC arrest control mode by switching from the trajectory tracking task to the aerodynamic angle tracking in order to recover and maintain healthy flight conditions at the cost of temporarily abandoning the mission trajectory; and (iv) a guidance trajectory designer for nominal flight restoration control mode after the successful arrest of a LOC upset. The iLOCPR system may also be used in manned aircraft for pilot assistance.

D. Nominal Flight Control Mode Design

The invention may include a nominal, or baseline, flight control mode. In one embodiment, the TLC 6DOF flight controller disclosed in U.S. Pat. No. 8,761,966 ("the '966 patent"), the disclosure of which is incorporated by reference herein in its entirety, may be used.

1. Improved Bank-to-Turn in Guidance Control

It will be appreciated that in the TLC 6DOF flight controller, the Bank-to-Turn (BTT) guidance was not optimally designed for the tracking error feedback control of the side force control allocation, since the side force was allocated into commanded sideslip angle $\beta_{com}$ so that the undesirable sideslip occurs. To minimize the undesired sideslip, a roll maneuver command defined by the auxiliary roll $\phi_{aux}$ may be introduced in this BTT improvement design. By rolling the aircraft, lateral component $Y_{com}$ of the commanded lift $L_{com}$ is used to provide the desired side force, thereby eliminating the undesired sideslip by $$Y_{com} = L_{com} \sin \phi_{aux} \quad (1)$$

where we have assumed the body-frame roll angle equals to the aerodynamic bank angle $\mu$ under small angle-of-attack $\alpha$ and sideslip angle $\beta$. Thus, the auxiliary roll can be obtained as $$\phi_{aux} = \arcsin\left(\frac{Y_{com}}{L_{com}}\right) \quad (2)$$

Therefore, the commanded roll angle is given by the following equation as $$\phi'_{com} = \phi_{com} + \phi_{aux} \qquad (3)$$

where $\phi_{com}$ is obtained from $$\Gamma = \begin{bmatrix} \phi \\ \theta \\ \psi \end{bmatrix} = \begin{bmatrix} \tan^{-1}\left(\Upsilon \frac{C_\beta}{C_\alpha} \frac{(a-b^2) + b\tan\alpha\sqrt{c(1-b^2) + \Upsilon^2 S_\beta^2}}{a^2 - b^2(1 + c\tan^2\alpha)}\right) \\ \tan^{-1} \frac{ef + S_\gamma\sqrt{e^2 - S_\gamma^2 + f^2}}{e^2 - S_\gamma^2} \\ \tan^{-1}\left\{\frac{(S_\mu S_\alpha - C_\alpha C_\mu S_\beta)C_\chi + [C_\gamma C_\alpha C_\beta - S_\gamma(S_\alpha C_\mu + S_\beta C_\alpha S_\mu)]S_\chi}{-(S_\mu S_\alpha - C_\alpha C_\mu S_\beta)S_\chi + [C_\gamma C_\alpha C_\beta - S_\gamma(S_\alpha C_\mu + S_\beta C_\alpha S_\mu)]C_\chi}\right\} \end{bmatrix} \qquad (4)$$

2. Wind Effect on Navigation and Aerodynamics

Other improvements may be made to the TLC 6DOF flight controller. For example, since the weather factor plays a significant role in aircraft motion and aerodynamics, the wind effect needs to be considered. In order to describe the atmosphere properties and the airflow (wind) movement relative to the inertial frame, the local atmospheric-fixed reference frame representing the air-mass surrounding the aircraft is added as a body-carried frame with its origin fixed at the center-of-gravity of the aircraft.

The three-dimensional local wind inertial velocity $V_a=[u_a \; v_a \; w_a]^T$, the vehicle velocity $V=[u \; v \; w]^T$ and the relative air velocity $V_t=[u_t \; v_t \; w_t]^T$ can be expressed in the body frame as $$V_t = V - V_a = \begin{bmatrix} u_t \\ v_t \\ w_t \end{bmatrix} = \begin{bmatrix} u \\ v \\ w \end{bmatrix} - \begin{bmatrix} u_a \\ v_a \\ w_a \end{bmatrix} \qquad (5)$$

Figure 2A:
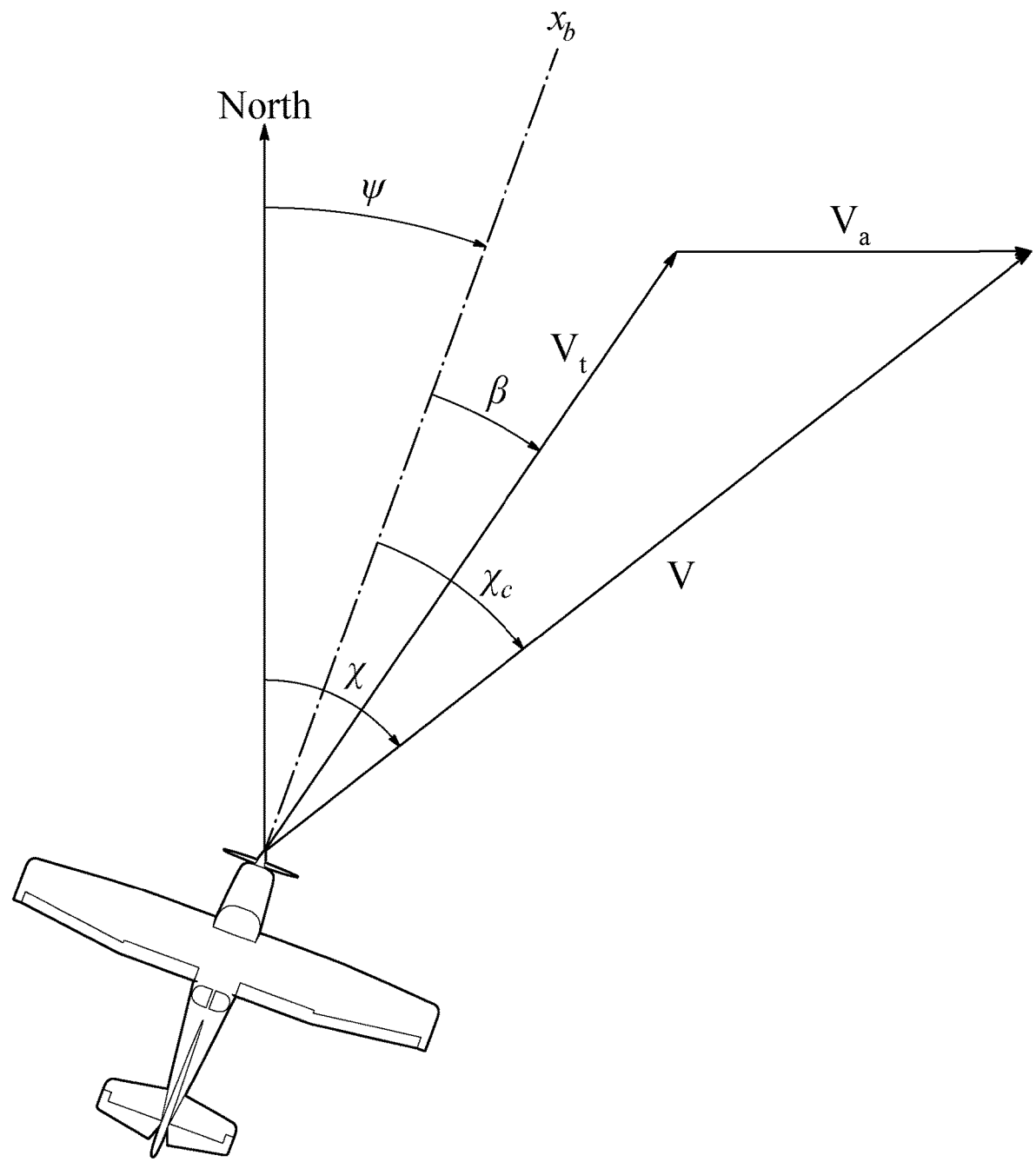
FIG. 2A is a top view of the aircraft of FIG. 1, further showing a horizontal view of a wind triangle.
Figure 2B:
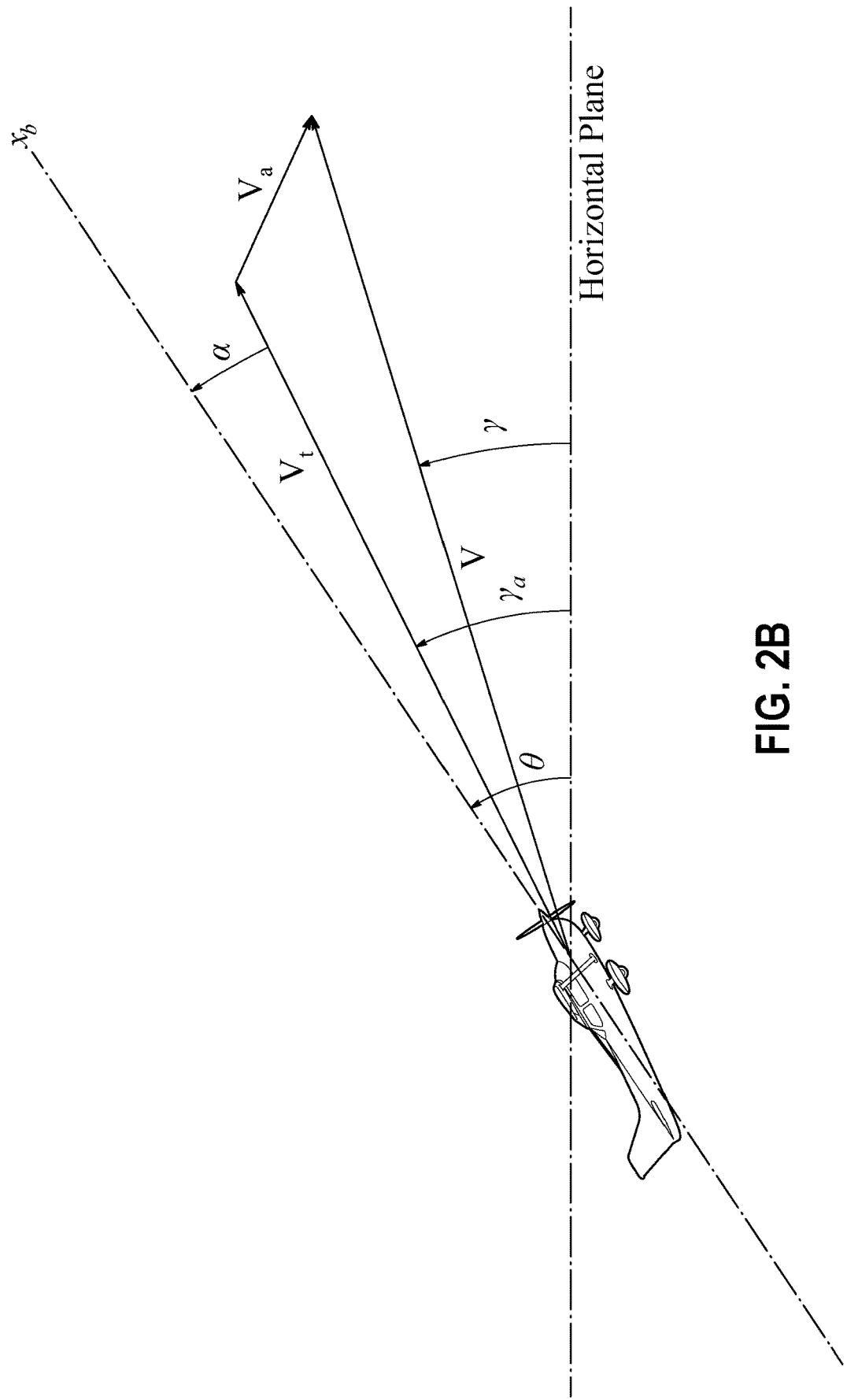
FIG. 2B is a top view similar to FIG. 2A, further showing a vertical view of a wind triangle.

This wind vectors relationship is called the wind triangle as depicted in FIGS. 2A-2B.

In addition to the heading angle $\chi$ and flight path angle $\gamma$ describing the direction of the flight in the Inertial frame, the horizontal and vertical wind triangle components are defined as the crab angle $\chi_c = \chi - \psi$ and air-mass-referenced flight-path angle $\gamma_a = \theta - \alpha$, respectively. These two wind-related angles are defined to navigate the vehicle in the inertial frame for trajectory tracking in the presence of wind. In this case, the commanded Euler attitude described in Eq. (4) is redesigned as follows when considering the wind triangle $$\Gamma_{com} = \begin{bmatrix} \phi_{com} \\ \gamma_a + \alpha \\ \chi - \chi_c \end{bmatrix} \qquad (6)$$

where the wind triangle can be approximately calculated by $$\gamma_a = \gamma + \arcsin\left(\frac{1}{V_t}\begin{bmatrix} w_n \\ w_e \\ w_d \end{bmatrix}^T \begin{bmatrix} C_\chi S_\gamma \\ S_\chi S_\gamma \\ C_\gamma \end{bmatrix}\right), \qquad (7)$$

$$\chi_c = \arcsin\left(\frac{1}{V_t C_{\gamma_a}}\begin{bmatrix} w_n \\ w_e \end{bmatrix}^T \begin{bmatrix} -S_\chi \\ C_\chi \end{bmatrix}\right)$$

Note that the inertial wind velocity vector $V_a=[u_a \; v_a \; w_a]^T$ is estimated by subtracting the sensed relative wind velocity $V_{t,sen}$ from the sensed vehicle velocity $V_{sen}$. It is emphasized that these changes only apply to the feedback error stabilizers, whereas the open-loop nominal controller is unaffected as the nominal wind velocity is assumed to be zero.

As a system parameter, the dynamic pressure depends on the local density of the atmosphere $\bar{\rho}$ and the airspeed $V_t$ as $Q=\frac{1}{2}\bar{\rho}V_t^2$, which is implemented according to the relative wind velocity obtained by Eq. (5). Also, the aerodynamic angles are determined by the relative wind velocity as:

$$\alpha = \arctan\left(\frac{w_t}{u_t}\right), \qquad (8)$$

$$\beta = \arctan\left(\frac{v_t}{V_t}\right),$$

$$\mu = \arctan\left(\frac{u_t v_t S_\theta + (u_t^2 + w_t^2)S_\phi C_\theta - u_t w_t C_\phi C_\theta}{V_t(w_t S_\theta + u_t C_\phi C_\theta)}\right)$$

In implementation, $V_t$, $\bar{\rho}$, $\alpha$, and $\beta$ can be readily measured by an air data probe, and the ground speed can be obtained from satellite based GPS or ground-based navigation systems.

3. Stall Characteristics

Figure 3:
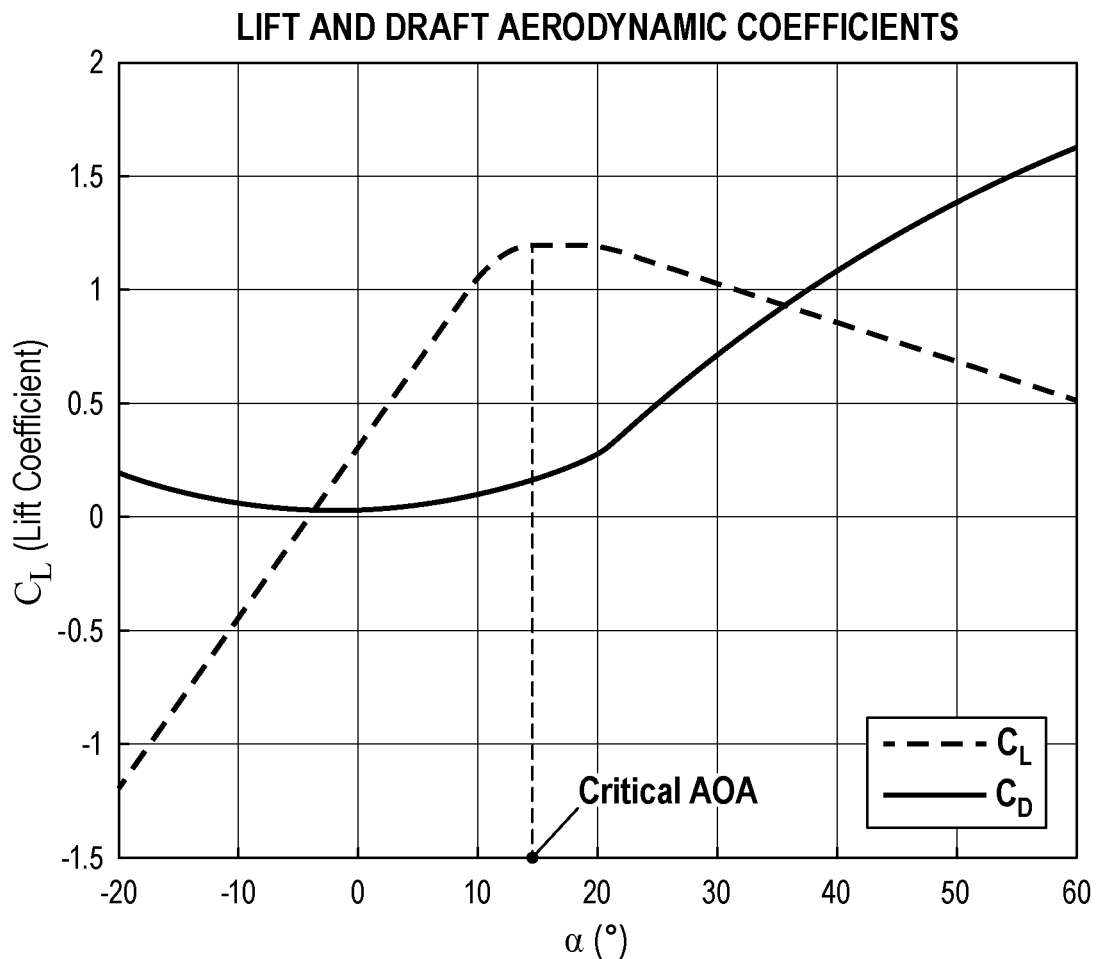
FIG. 3 is a graph illustrating typical lift and drag coefficients varying with angle of attack for an exemplary aircraft.

For LOC arrest control, post-stall aerodynamic coefficients may be added to the TLC 6DOF flight controller in order to calculate the aerodynamic forces under stall conditions. FIG. 3 provides the aerodynamic lift and drag coefficients in full flight envelope for typical fixed-wing aircraft according to the wind-tunnel test results.

While the above improvements have been described with respect to the TLC 6DOF flight controller, they may be incorporated into any other suitable nominal or baseline design, as may be desired.

E. LOC Prevention Control Mode Design (Bandwidth Adaptation)

The baseline controller is capable of accommodating moderate wind conditions to maintain the inertial trajectory tracking task. Based on the singular perturbation theory, severe wind can be managed at the cost of reduced tracking performance by reducing the bandwidth (integral gain) of the closed-loop tracking error dynamics. The TLC 6DOF flight controller comprises four loops, and each loop has three channels, corresponding to the 6DOF in four loops. Accordingly, 12 second-order linear time-varying closed-loop tracking error dynamics $$\ddot{x}_{ij} + \alpha_{ij2}(t)\dot{x}_{ij} + \alpha_{ij1}(t)x_{ij} = 0, i=1,2,3,4, j=1,2,3 \qquad (9)$$

are synthesized using the constant damping time-varying PD-eigenvalues $$\rho_{ij}(t) = (-\zeta_{ij} \pm j\sqrt{1-\zeta_{ij}^2})\omega_{n,ij}(t), i=1,2,3,4, j=1,2,3 \qquad (10)$$

by the PD-spectral synthesis formula $$\alpha_{ij1}(t) = \omega_{n,ij}^2(t), \; \alpha_{ij2}(t) = 2\zeta_{ij}\omega_{n,ij}(t) - \frac{\dot{\omega}_{n,ij}(t)}{\omega_{n,ij}(t)}, \quad (11)$$

$$i = 1, 2, 3, 4, \; j = 1, 2, 3$$

where the index i is the loop number counting from outer loop to inner loop and j is the channel number; $\omega_{n,ij}(t)$ are time-varying natural frequencies $\zeta_{ij}$ and are the constant damping ratios of the desired closed-loop dynamics for each state variable $x_{ij}$. However, constant natural frequencies $\omega_{n,ij}(t) = \omega_{n,nom}$ were used for the baseline controller in the TLC 6DOF controller in the '966 patent, therefore, Eq. (11) was reduced to the familiar LTI synthesis formula, and the closed-loop dynamics were LTI in nature.

Figure 4:
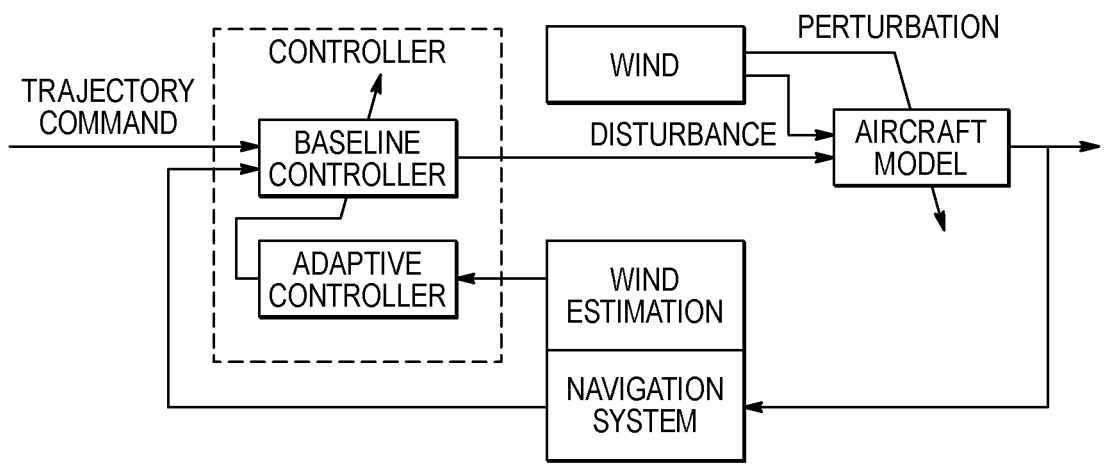
FIG. 4 is a block diagram illustrating an exemplary loss-of-control prevention controller augmentation in accordance with an aspect of the invention.

By way of example and without limitation, time-varying natural frequency $\omega_{n,ij}(t)$, which is proportional and approximately equal to the closed-loop (instantaneous) bandwidth, will be used herein for a real-time trade-off between tracking performance and robustness to prevent LOC. In this case, a TLC based adaptive control is proposed in FIG. 4, where the aircraft model is subject to wind disturbance and perturbation; and the control system is augmented with a time-varying bandwidth adaptive controller. Both the baseline controller and the adaptive controller rely on the feedback from the on-board navigation system.

1. The General Bandwidth Adaptation Law

For a multi-loop flight controller, wind effects that reduce the effective bandwidth of an inner-loop such as integrator windup can be treated as an increase in singular perturbation to its outer loops. Therefore, by the singular perturbation (time-scale separation) principle, the bandwidths of the outer loops should be reduced accordingly to preserve stability at the cost of reduced tracking performance. This bandwidth adaptation scheme can be readily realized with the time-varying bandwidth $\omega_{n,ij}(t)$ in Eq. (11). A single adaptation gain $k_a(t)$ will be used for all bandwidths $$\omega_{n,ij}(t) = k_a(t)\omega_{n,ij,nom} \quad (12)$$

where the constant bandwidths $\omega_{n,ij,nom}$ are those of the nominal flight control mode as given in Table 1, which will be called nominal bandwidths. These values are exemplary only, and the $\omega_{n,ij,nom}$ should be designed for the specific aircraft. Thus, the $\omega_{n,ij,nom}$ are aircraft-dependent. The $\omega_{n,ij,nom}$ are first synthesized and tuned for the desired tracking performance with reasonable robustness in no wind condition. In addition, the $\zeta_{ij,nom}$ values shown in Table 1 are typical, and can be tuned for optimal performance. Based on the singular perturbation principle, Table 2 gives the expected behaviors of tracking performance and wind tolerance under bandwidth adaptation, where the Tolerable Wind Amplitude (TWA) can be used as a measure of the wind tolerance capability; $\|x_{error}\|_1$ is the cumulative state tracking error measured in $L_1$-norm; $k_{a,min}$ and $k_{a,max}$ are the extreme values of $k_a(t)$ beyond which stability will be lost due to an exceedance of stability margins.

TABLE 1

Nominal TLC controller parameters.

| | Loop 1 | | | Loop 2 | | | Loop 3 | | | Loop 4 | | |
|---|---|---|---|---|---|---|---|---|---|---|---|---|
| | x | y | z | u | v | w | φ | θ | ψ | p | q | r |
| $\omega_{n,ij,nom}$ | 0.075 | 0.075 | 0.005 | 0.075 | 0.005 | 0.098 | 0.098 | 0.005 | 0.098 | 0.390 | 0.036 | 0.390 |
| $\zeta_{ij,nom}$ | 1.414 | 1.414 | 1.414 | 1.414 | 1.414 | 1.414 | 1.414 | 1.414 | 1.414 | 1.414 | 1.414 | 1.414 |

TABLE 2

Bandwidth adaptation, expected TWA and tracking performance.

| Adaptation Constant | Bandwidth | TWA | $\|x_{error}\|_1$ |
|---|---|---|---|
| $k_{a,min}$ | $\omega_{n,min}$ | $V_{a,max}$ | $\|x_{error}\|_{1,max}$ |
| $k_{a,nom}$ | $\omega_{n,nom}$ | $V_{a,nom}$ | $\|x_{error}\|_{1,nom}$ |
| $k_{a,max}$ | $\omega_{n,max}$ | $V_{a,min}$ | $\|x_{error}\|_{1,min}$ |

According to Eq. (12), $$\frac{\dot{\omega}_{n,ij}(t)}{\omega_{n,ij}(t)} = \frac{\omega_{n,ij,nom}\dot{k}_a(t)}{\omega_{n,ij,nom}k_a(t)} = \frac{\dot{k}_a(t)}{k_a(t)} \quad (13)$$

Therefore, the PD-spectral synthesis formula in Eq. (11) can be rewritten as $$\alpha_{ij1}(t) = \alpha_{ij1,nom}k_a^2(t), \; \alpha_{ij2}(t) = \alpha_{ij2,nom}k_a(t) - \frac{\dot{k}_a(t)}{k_a(t)}, \quad (14)$$

Figure 5:
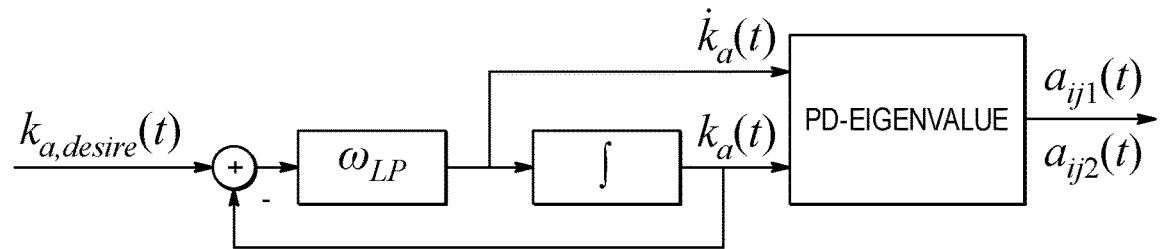
FIG. 5 is a block diagram illustrating an adaptive gain structure in accordance with an aspect of the invention.

The bandwidth adaptation gain $k_a(t)$ and $\dot{k}_a(t)$ can be implemented using a first-order pseudo-differentiator as shown in FIG. 5, where $\omega_{LP}$ is a design parameter that determines the time constant of the $k_a(t)$ in response to a step command $k_{a,desire}(t)$. The time-varying coefficients $\alpha_{ij1}(t)$ and $\alpha_{ij2}(t)$ are then programmed into the baseline controller to replace the corresponding constant coefficients in the constant PI gain matrices $K_P$, $K_I$ described in the '966 patent.

2. Wind Adaptation Law Design

Figure 8:
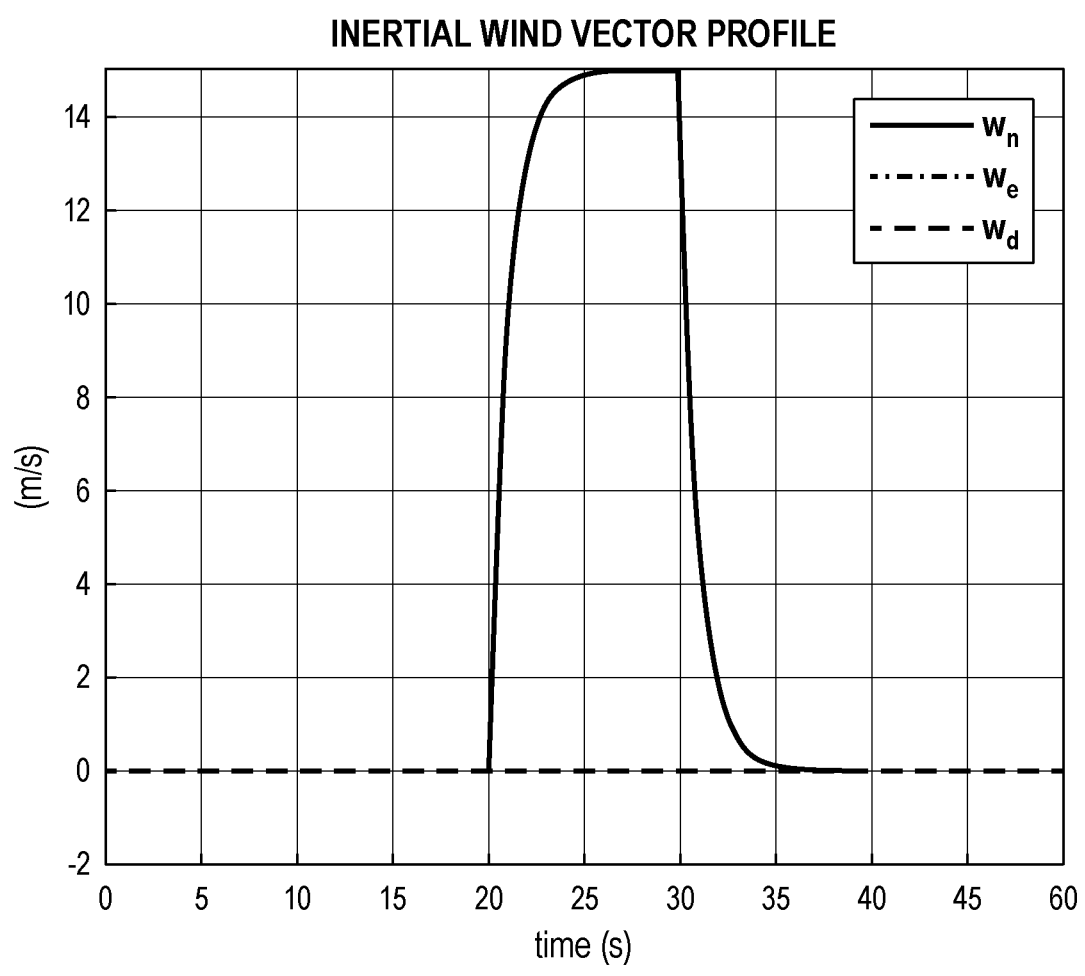
FIG. 8 is a graph illustrating an exemplary wind condition in defining the severe wild tolerance capability.

As shown in Table 3, with modifications as described above, the extreme bandwidths $\omega_{n,min}$ and $\omega_{n,max}$, TWA along with the corresponding tracking error metric are experimentally determined under each wind case. The numbers shown are presented for a particular aircraft and are intended to be exemplary only, and the amplitude of the wind in determining the TWA is defined using a standardized wind profile as shown in FIG. 8. It will be appreciated that the invention applies more broadly to any aircraft, including those having values different than those shown. Note that in Table 3, the tracking error metric $\|x_{error}\|_1$ goes up as $k_a$ decrease and goes down as $k_a$ increases, in support of the rationale for the bandwidth adaptation. Note also that the adaptation gain is reduced to 0.01 when downdraft is accommodated, which means the trajectory tracking is practically abandoned temporarily to prevent the vehicle from wind-induced LOC.

TABLE 3

Bandwidth adaptation, TWA and tracking error under wind conditions

| | $\omega_{n,min}$ | | | $\omega_{n,nom}$ | | | $\omega_{n,max}$ | | |
|---|---|---|---|---|---|---|---|---|---|
| Wind Condition | $k_{a,min}$ | TWA | $\|x_{error}\|_1$ | $k_{a,nom}$ | TWA | $\|x_{error}\|_1$ | $k_{a,max}$ | TWA | $\|x_{error}\|_1$ |
| Tailwind | 0.1 | 19 | 1.7e05 | 1 | 5 | 6.3e04 | 1.2 | 1 | 2.5e04 |
| Headwind | 0.1 | 80 | 434.4 | 1 | 75 | 1.2 | 1.2 | 15 | 0.3 |
| Crosswind | 0.1 | 25 | 6.1e04 | 1 | 7 | 3.2e04 | 1 | 4 | 3.2e03 |
| Downdraft | 0.01 | 25 | 9.9e04 | 1 | 3 | 2.9 | 1.2 | 2 | 0.9 |
| Updraft | 0.3 | 6 | 1.4e04 | 1 | 1 | 11.9 | 1.2 | 1 | 1.4 |

The adaptation laws are designed based on $V_{a,sen} = V_{sen} - V_{t,sen}$, where the onboard ground speed sensor and airspeed sensor will be required to estimate the wind velocity. Then the time-varying bandwidth adaptation laws can be described on each wind case as in Table 4:

TABLE 4

Wind adaptation law.

| Wind Condition | Adaptation Gain |
|---|---|
| Tailwind | $k_a(u_a, 0, 0) = \begin{cases} -0.06 u_a + 1 & 0 \le u_a \le 15 \\ 0.1 & u_a > 15 \end{cases}$ |
| Headwind | $k_a(u_a, 0, 0) = \begin{cases} 1 & -75 \le u_a \le 0 \\ 0.1 & u_a < -75 \end{cases}$ |
| Crosswind | $k_a(0, v_a, 0) = \begin{cases} -0.036 v_a + 1 & 0 \le |v_a| \le 25 \\ 0.1 & |v_a| > 25 \end{cases}$ |
| Downdraft | $k_a(0, 0, w_a) = \begin{cases} -0.33 w_a + 1 & 0 < w_a \le 3 \\ 0.01 & w_a > 3 \end{cases}$ |
| Updraft | $k_a(0, 0, w_a) = \begin{cases} 0.3 & w_a < -1 \\ 1 & -1 \le w_a < 0 \end{cases}$ |

Figure 6:
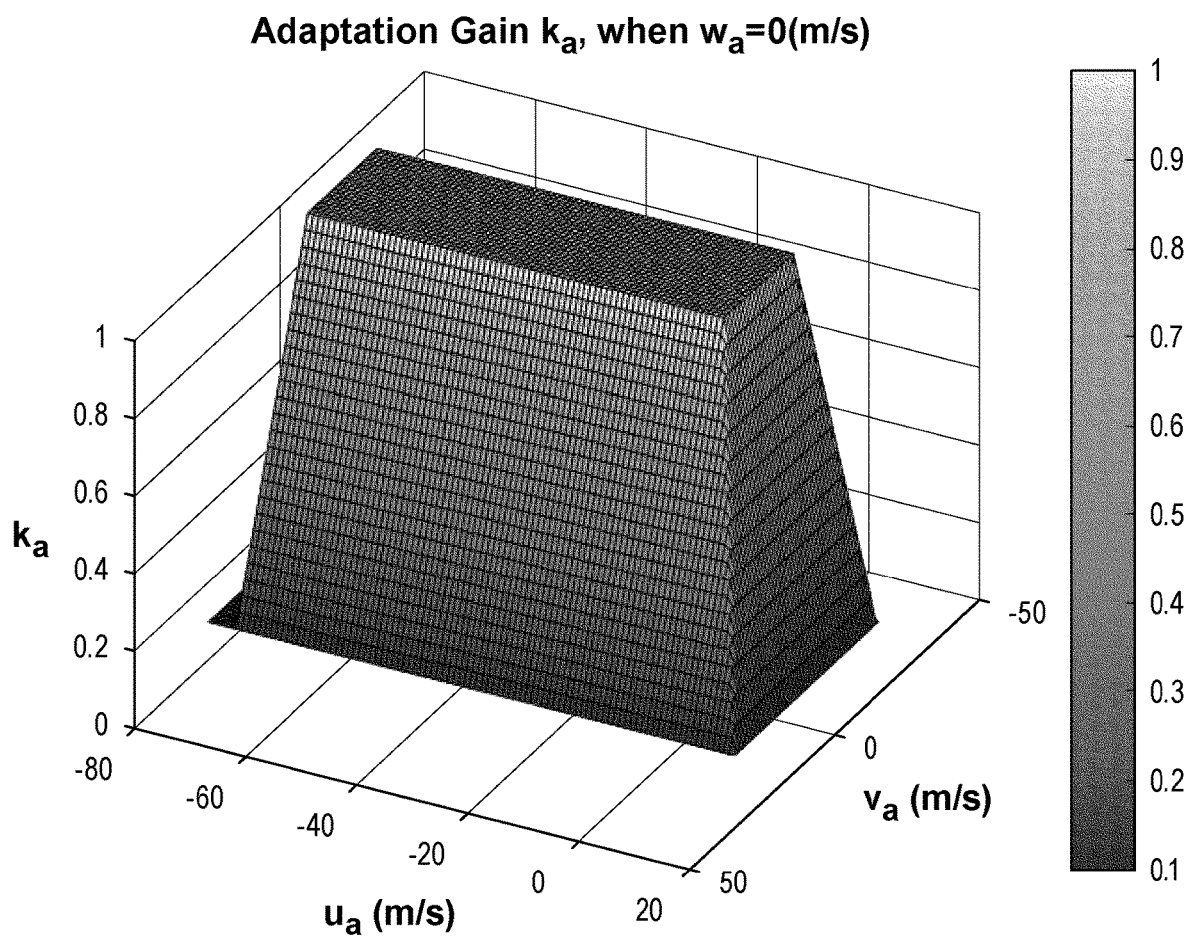
FIG. 6 is a graph illustrating bandwidth adaptation gain in accordance with an aspect of the invention.

For wind velocity vector with three non-zero components acting in the body frame, the bandwidth adaptation law is designed by $$\omega_n(t) = k_a(t)\omega_{n,nom}, \text{ where } k_a(t) = \min(k_a(u_a,0,0), k_a(0,v_a,0), k_a(0,0,w_a)) \quad (15)$$

where the $k_a$ is inherited from the adaptation law design for individual wind case in Table 4. Such adaptation can ensure the minimum bandwidth requirement for longitudinal, vertical and lateral wind combination. FIG. 6 shows the adaptation gain $k_a$ for the three-dimensional wind speed when $w_a = 0$ m/s. It will be appreciated that while the values shown in Table 4 are for a specific type of aircraft, these are intended to be exemplary only and the invention applies more broadly to other aircraft having different values.

F. LOC Arrest Control Mode Design

LOC Arrest Control Mode is designed to guarantee the aircraft to stay within a healthy aerodynamic envelope even at the cost of momentarily abandoning trajectory tracking objective. Once LOC is detected, a logic may be used to switch the controller automatically to LOC Arrest Control Mode from any of the control modes that the controller is in, where all other control modes use the baseline controller.

1. Switching Logic

In one embodiment, a switching flag is set to be active when LOC occurs; then the baseline flight controller needs to be disarmed. Such operation is achieved by setting tracking command equal to the sensed flight states including $P_{sen}$, $V_{sen}$, $\Gamma_{sen}$, $\Omega_{sen}$, so that the tracking errors are always zero. The integrations in the baseline controller for tracking control is disengaged. Meanwhile, the LOC Arrest Control Mode needs to be engaged to take control of the aircraft.

2. Wind Frame EOM

The rotational kinematic EOM in the Wind Frame, rotational dynamics EOM in the Body-Fixed Frame are given as follows Rotational Kinematics (Body Frame relative to Wind Frame)

$$\begin{bmatrix} \dot{\alpha} \\ \dot{\beta} \\ \dot{\mu} \end{bmatrix} = \begin{bmatrix} -T_\beta C_\alpha & 1 & -T_\beta S_\alpha \\ S_\alpha & 0 & -C_\alpha \\ C_\alpha/C_\beta & 0 & S_\alpha/C_\beta \end{bmatrix} \begin{bmatrix} p \\ q \\ r \end{bmatrix} + \begin{bmatrix} \Sigma_1 \\ \Sigma_2 \\ \Sigma_3 \end{bmatrix} \quad (16)$$

$$\dot{\Lambda} = B_S(\Lambda)\Omega + f_S(\Lambda)$$

where $\Lambda = [\alpha \; \beta \; \mu]^T$ is the aerodynamic attitude vector and $$\Sigma_1 = -\frac{1}{mVC_\beta}(L + TS_\alpha) + \frac{g C_\gamma C_\mu}{VC_\beta}$$

$$\Sigma_2 = \frac{1}{mV}(DS_\beta + YC_\beta - TC_\alpha S_\beta) + \frac{g C_\gamma S_\mu}{V}$$

$$\Sigma_3 = \frac{1}{mV}[DT_\gamma S_\beta C_\mu + YT_\gamma C_\beta C_\mu + L(T_\beta + T_\gamma S_\mu) + T(T_\gamma S_\alpha S_\mu + S_\alpha T_\beta - T_\gamma C_\alpha S_\beta C_\mu)] - \frac{g C_\gamma C_\mu T_\beta}{V}$$

in which D, Y, L are the aerodynamic force components drag, sideforce, and lift, respectively.

Figure 7:
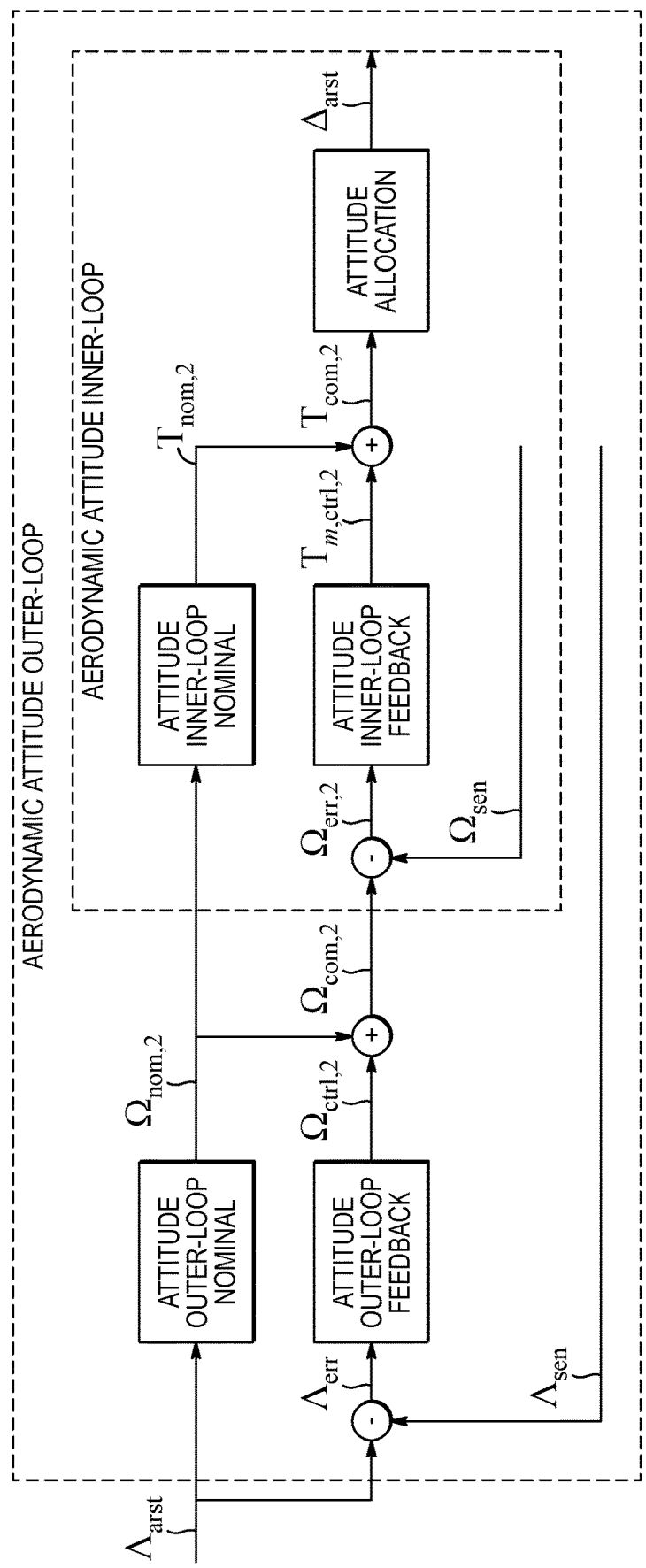
FIG. 7 is a block diagram illustrating a loss-of-control arrest control mode configuration in accordance with an aspect of the invention.

Rotational Dynamics $$\begin{bmatrix} \dot{p} \\ \dot{q} \\ \dot{r} \end{bmatrix} = \begin{bmatrix} g_l^p & 0 & g_n^p \\ 0 & g_m^q & 0 \\ g_l^r & 0 & g_n^r \end{bmatrix} \begin{bmatrix} L_m \\ M_m \\ N_m \end{bmatrix} + \begin{bmatrix} I_{pq}^p pq + I_{pr}^p qr \\ I_{pp}^q p^2 + I_{rr}^q r^2 + I_{pr}^q pr \\ I_{pq}^r pq + I_{qr}^r qr \end{bmatrix} \quad (17)$$

$$\dot{\Omega} = B_6 T_m + f_6(\Omega)$$

where $\Omega=[p\ q\ r]^T$ is the angular velocity vector. The LOC Arrest Control Mode TLC control configuration is illustrated in FIG. 7.

3. LOC Arrest Control Mode Command

The commanded aerodynamic attitude $\Lambda_{arst}=[\alpha_{arst}\ \beta_{arst}\ \mu_{arst}]^T=[\alpha_{trim}\ 0\ 0]^T$ can be determined by the level and straight flight trim value of angle-of-attack as $W=L=\overline{Q}S(C_{L_0}+C_{L_\alpha}\alpha_{tri})$ and zero sideslip and bank angles, where the dynamic pressure $\overline{Q}$ is chosen by desired value of the end of the arrest based on the altitude and airspeed. On the other hand, a level flight path angle $\gamma'_{com}=0°$ is commanded depending on allowable altitude loss. In order to quickly recover the healthy aerodynamic attitude, the full throttle control $\delta_{\tau,arst}=1$ is applied. This full throttle effect for arrest operation would require a "mission restoration" controller (discussed below) to be designed at the end of the arrest to restore the throttle command and to redirect the aircraft back to the mission trajectory.

4. Aerodynamic Attitude Outer Loop

In an exemplary embodiment, the controller is designed to track the commanded aerodynamic profile using TLC and the controller configuration, as shown in FIG. 7.

The outer loop of the aerodynamic attitude control takes in aerodynamic attitude command $\Lambda_{nom}=\Lambda_{com}$ and the sensed states $\Lambda_{sen}$ to calculate the body rate command for the inner loop. For aerodynamic attitude tracking, the nominal body rate is given by inverting (16)

$$\Omega_{nom,2}=B_5^{-1}(\Lambda_{nom})(\dot{\Lambda}_{nom}-f_5(\Lambda_{nom})) \qquad (18)$$

Then with the tracking error $\Lambda_{err}=\Lambda_{sen}-\Lambda_{com}$, the Proportional-Integral (PI) feedback control law is obtained from the desired PD-eigenvalues based TLC design as shown below.

$$\Omega_{ctrl,2}=-K_{P5}(t)\Lambda_{err}-K_{I5}(t)\int\Lambda_{err} \qquad (19)$$

where $$K_{P5} = \begin{bmatrix} k_{p5,11} & k_{p5,12} & k_{p5,13} \\ k_{p5,21} & k_{p5,22} & k_{p5,23} \\ k_{p5,31} & k_{p5,32} & k_{p5,33} \end{bmatrix}, \qquad (20)$$

$$K_{I5} = \begin{bmatrix} 0 & \alpha_{521}S_\alpha & \alpha_{531}C_\alpha C_\beta \\ \alpha_{511} & 0 & \alpha_{531}S_\beta \\ 0 & -\alpha_{512}C_\alpha & \alpha_{531}S_\alpha C_\beta \end{bmatrix}$$

in which $$k_{p5,11}=\frac{T}{mV}(C_\alpha^2 C_\beta S_\mu T_\gamma + S_\alpha C_\alpha S_\beta C_\beta C_\mu T_\gamma + S_\beta)+r$$

$$k_{p5,12}=S_\alpha\left[\alpha_{322}+\frac{1}{mV}(DC_\beta-YS_\beta-TC_\alpha C_\beta)\right]+$$
$$\frac{1}{mVC_\beta}[C_\alpha(L+TS_\alpha-mgC_\mu C_\gamma+DC_\beta^3 C_\mu T_\gamma-$$
$$TC_\alpha C_\beta^3 C_\mu T_\gamma - YS_\beta C_\beta^2 C_\mu T_\gamma)]+pC_\alpha^2 T_\beta+rS_\alpha C_\alpha T_\beta$$

$$k_{p5,13}=\frac{1}{mV}[C_\alpha C_\beta(\alpha_{322}mV+LC_\mu T_\gamma+TS_\alpha C_\mu T_\gamma-DS_\beta S_\mu T_\gamma+$$
$$YC_\beta S_\mu T_\gamma+WT_\beta S_\mu C_\gamma+TC_\alpha S_\beta S_\mu T_\gamma)-WS_\alpha S_\mu C_\gamma]$$

$$k_{p5,21}=\frac{1}{mV}\left[-TS_\alpha C_\beta^2 C_\mu T_\gamma - TC_\alpha C_\beta + TS_\alpha C_\mu T_\gamma + TC_\alpha S_\beta S_\mu T_\gamma\right]+\alpha_{312}$$

$$k_{p5,22}=\frac{T_\gamma}{mV}\left[-YC_\mu+YC_\beta^2 C_\mu+DS_\alpha C_\beta C_\mu - TC_\alpha S_\beta C_\beta C_\mu\right]-pC_\alpha-rS_\alpha$$

$$k_{p5,23}=\frac{1}{mV}[S_\beta(LC_\mu T_\gamma+TS_\alpha C_\mu T_\gamma-DS_\beta S_\mu T_\gamma-YC_\beta S_\mu T_\gamma+mgT_\beta S_\mu C_\gamma+$$
$$TC_\alpha S_\beta S_\mu T_\gamma)-mgS_\mu C_\gamma/C_\beta]+\alpha_{332}S_\beta$$

$$k_{p5,31}=\frac{TT_\gamma}{mV}\left[S_\alpha C_\alpha C_\beta S_\mu - S_\alpha^2 S_\beta C_\beta C_\mu\right]-p$$

$$k_{p5,32}=\frac{1}{mVC_\beta}[S_\alpha(L+TS_\beta-mgC_\mu C_\gamma+DC_\beta^3 C_\mu T_\gamma-TC_\alpha C_\beta^3 C_\mu T_\gamma-Y$$
$$S_\beta C_\beta^2 C_\mu T_\gamma)]+pS_\alpha C_\alpha T_\beta+rS_\alpha^2 T_\beta -$$
$$C_\alpha\left[\alpha_{322}-\frac{1}{mV}(YS_\beta-DC_\beta+TC_\alpha C_\beta)\right]$$

$$k_{p5,33}=\frac{1}{mV}[S_\alpha C_\beta(LC_\mu T_\gamma+TS_\alpha C_\mu T_\gamma-DS_\beta S_\mu T_\gamma-YC_\beta S_\mu T_\gamma+$$
$$mgT_\beta S_\mu C_\gamma+TC_\alpha S_\beta S_\mu T_\gamma)+mg$$
$$C_\alpha S_\mu C_\gamma]+\alpha_{332}S_\alpha C_\beta$$

The gain matrices are synthesized from the time-varying PD-eigenvalues by the desired closed-loop behavior of the tracking error dynamics. The output of the attitude outer-loop controller is then obtained as $$\Omega_{com,2}=\Omega_{nom,2}+\Omega_{ctrl,2} \qquad (22)$$

5. Aerodynamic Attitude Inner Loop

The nominal moment vector is calculated by inverting (17) to obtain $T_{m,nom,2}=B_6^{-1}[\dot{\Omega}_{nom,2}-f_6(\Omega_{nom,2})]$, and the PI control law for this loop is $$T_{m,ctrl,2}=-K_{P6}\Omega_{err,2}-K_{I6}\int_{t_0}^t \Omega_{err,2}(\sigma)d\sigma \qquad (23)$$

where $\Omega_{err,2}=\Omega_{sen}-\Omega_{comm,2}$ and $$K_{P4}=\begin{bmatrix} I_{xx}(\alpha_{412}+I_{pq}^p\overline{q})-I_{pq}^r I_{xz}\overline{q} & I_{xx}(I_{pp}^p\overline{p}+I_{pr}^p\overline{r})-I_{xz}(I_{pq}^r\overline{p}+I_{qr}^r\overline{r}) & I_{xx}I_{qr}^p\overline{q}-I_{xz}(I_{qr}^r\overline{q}+\alpha_{432}) \\ I_{yy}(2I_{pp}^q\overline{p}+I_{pr}^q\overline{r}) & \alpha_{422}I_{yy} & I_{yy}(2I_{rr}^q\overline{r}+I_{pr}^q\overline{p}) \\ -I_{xz}(I_{pq}^p\overline{q}+\alpha_{412})+I_{zz}I_{pg}^r\overline{q} & -I_{xz}(I_{pp}^p\overline{p}+I_{qr}^p\overline{r})+I_{zz}(I_{pq}^r\overline{p}+I_{qr}^r\overline{r}) & -I_{xz}I_{qr}^p\overline{q}+I_{zz}(I_{qr}^r\overline{q}+\alpha_{432}) \end{bmatrix}$$

$$K_{I4}=\begin{bmatrix} I_{xx}\alpha_{411} & 0 & -I_{xz}\alpha_{431} \\ 0 & I_{yy}\alpha_{421} & 0 \\ -I_{xz}\alpha_{411} & 0 & I_{zz}\alpha_{431} \end{bmatrix}$$

The commanded moment is then given by $$T_{m,com,2} = T_{m,nom,2} + T_{m,ctrl,2} \qquad (24)$$

6. Attitude Control Allocation

The moment equations are written in terms of the control effectiveness Jacobian, so that $$\begin{bmatrix} L_m - QSbC_{l_\beta}\beta \\ M_m - QS\bar{c}(C_{m_0} + C_{m_\alpha}\alpha) \\ N_m - QSbC_{n_\beta}\beta \end{bmatrix} = \qquad (25)$$

$$\begin{bmatrix} QSbC_{l_{\delta_a}} & 0 & QSbC_{l_{\delta_r}} \\ 0 & QS\bar{c}C_{m_{\delta_e}} & 0 \\ QSbC_{n_{\delta_a}} & 0 & QSbC_{n_{\delta_r}} \end{bmatrix} \begin{bmatrix} \delta_a \\ \delta_e \\ \delta_r \end{bmatrix}$$

and inversion of (25) gives the control surface deflections command as:

$$\Delta_{arst} = \begin{bmatrix} QSbC_{l_{\delta_a}} & 0 & QSbC_{l_{\delta_r}} \\ 0 & QS\bar{c}C_{m_{\delta_e}} & 0 \\ QSbC_{n_{\delta_a}} & 0 & QSbC_{n_{\delta_r}} \end{bmatrix}^{-1} \qquad (26)$$

$$\begin{bmatrix} L_{m,com} - QSbC_{l_\beta}\beta_{com} \\ M_{m,com} - QS\bar{c}(C_{m_0} + C_{m_\alpha}\alpha_{com}) \\ N_{m,com} - QSbC_{n_\beta}\beta_{com} \end{bmatrix}$$

G. Nominal Flight Restoration Control Mode Design

The position tracking errors may increase to beyond the capability of the nominal flight control mode after the LOC arrest. A nominal flight restoration control mode may therefore be needed in order to reduce the position tracking error to a level that can be accommodated by the nominal flight control mode to eventually restore the mission.

1. Nominal Flight Restoration Control Mode Configuration

Figure 9:
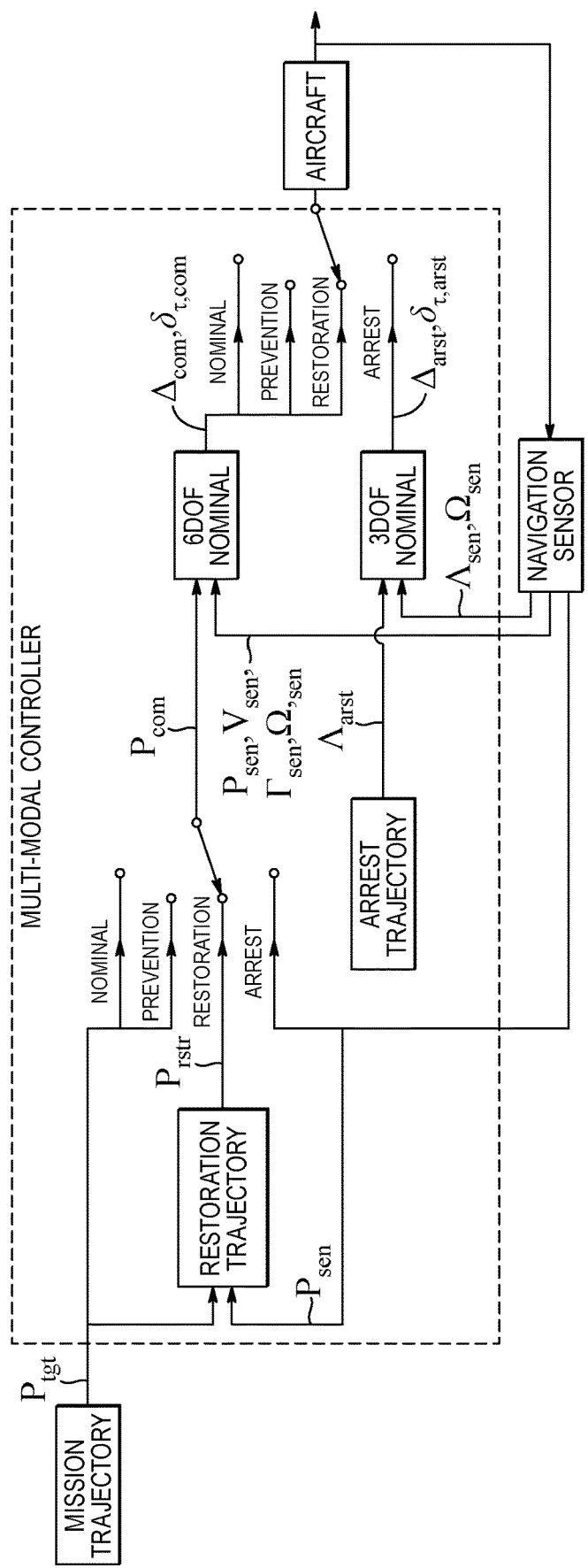
FIG. 9 is a block diagram illustrating a multimodal control system configuration in accordance with an aspect of the invention.

The nominal flight restoration control mode configuration in the multi-modal control system iLOCPR is shown in FIG. 9, in which the mission trajectory is replaced by a restoration trajectory as the command trajectory in order to direct the vehicle back to the mission trajectory after a successful arrest of upset.

Assuming a virtual aircraft that is moving along the mission trajectory at a prescribed time, such virtual target can be referred as a target point, whose position is predefined in the inertial frame. At the end of LOC arrest, the flight envelope determining healthy flight states is recovered as $$\Lambda \in O_1 \text{ AND } \Omega \in O_2 \text{ AND } V_t \in O_3 \qquad (27)$$

where $O_1 = \{\Lambda : \alpha \in [-2°, 5°], \beta \in [-5°, 5°], \mu \in [-20°, 20°]\}$ $O_2 = \{\Omega : p, q, r \in [-20°/\text{sec}, 20°/\text{sec}]\}$ $O_3 = \{V_t \in [1.5V_{stall}, V_{max}]\} \qquad (28)$ where $\Lambda = [\alpha\ \beta\ \mu]^T$ are the aerodynamic angles; $\Omega = [p\ q\ r]^T$ are the angular rates; $V_{stall}$ and $v_{max}$ are the vehicle stall speed and the maximum achievable speed, respectively. The values given in Eq. (28) are exemplary only, and other values may be used depending on the particular aircraft. Flight envelope $O_1, O_2, O_3$ indicates the success of the LOC arrest.

At this moment, the nominal flight restoration control mode is engaged by setting the supervisory control flag=3 as shown in Table 5 Under this controller mode, the command trajectory is switched to $P_{com} = P_{rstr}$; the feedback variables are the same as the ones designed for the nominal flight control mode as $P_{sen}, V_{sen}, \Gamma_{sen}, \Omega_{sen}$; and the controller outputs are $\Delta_{com}, \delta_{\tau,com}$.

TABLE 5

Multi-Mode Controller Configuration

| Mode | flag | Trajectory | Active Controller | Controller Output |
|---|---|---|---|---|
| Nominal | 0 | $P_{tgt1}$ | 6DOF Nominal | $\Delta_{com}, \delta_{\tau,com}$ |
| Prevention | 1 | $P_{tgt}$ | 6DOF Nominal + BW Adaptation | $\Delta_{com}, \delta_{\tau,com}$ |
| Arrest | 2 | $\Lambda_{arst}$ | 3DOF Arrest | $\Delta_{arst}, \delta_{\tau,arst}$ |
| Resoration | 3 | $P_{rstr}$ | 6DOF Nominal | $\Delta_{com}, \delta_{\tau,com}$ |

By sensing the current position $P_{sen}$ and reading the target point $P_{tgt}$ at each sampling time, the range vector, which represents the position tracking error, can be obtained in real-time as $$R = [R_N\ R_E\ R_D]^T \qquad (29)$$
$$= P_{tgt} - P_{sen}$$
$$= [x_{tgt}\ y_{tgt}\ z_{tgt}]^T - [x_{sen}\ y_{sen}\ z_{sen}]^T$$

where the range vector R is described in NED Cartesian coordinate. However, the position tracking error is normally very large, since the altitude loss and course deviations usually occur during the LOC arrest.

In order to restore the original mission, two sequential sub-modes are designed for the mission restoration mode. The first sub-mode is called "close-in," in which a restoration trajectory $P_{rstr}$ is planned to reduce the range given in (29) to a moderate level, which will be defined as a capture box. Once the range is in the capture box, a sub-mode called "home-in" is designed to gradually restore the original mission. The design of these two sub-modes will be described as follows.

2. Close-in Control

The pure pursuit guidance (PPG) strategy is employed to cope with the large range vector (29) in the Cartesian coordinate by transforming it to the spherical coordinate as follows $$\rho = \arctan\left(\frac{R_E}{R_N}\right) \qquad (30)$$

$$\sigma = -\arcsin\left(\frac{R_D}{r}\right)$$

$$r = \sqrt{R_N^2 + R_E^2 + R_D^2}$$

where r is the range vector magnitude; $\rho$ is the azimuth angle and $\sigma$ is the elevation angle, respectively. Therefore, the range vector $R = [R_N\ R_E\ R_D]^T$ can be determined by the azimuth angle and the elevation angle as follows $$R_N = r \cos \rho \cos \sigma$$

$$R_E = r \sin \rho \cos \sigma$$

$$R_D = -r \sin \sigma \quad (31)$$

Figure 10:
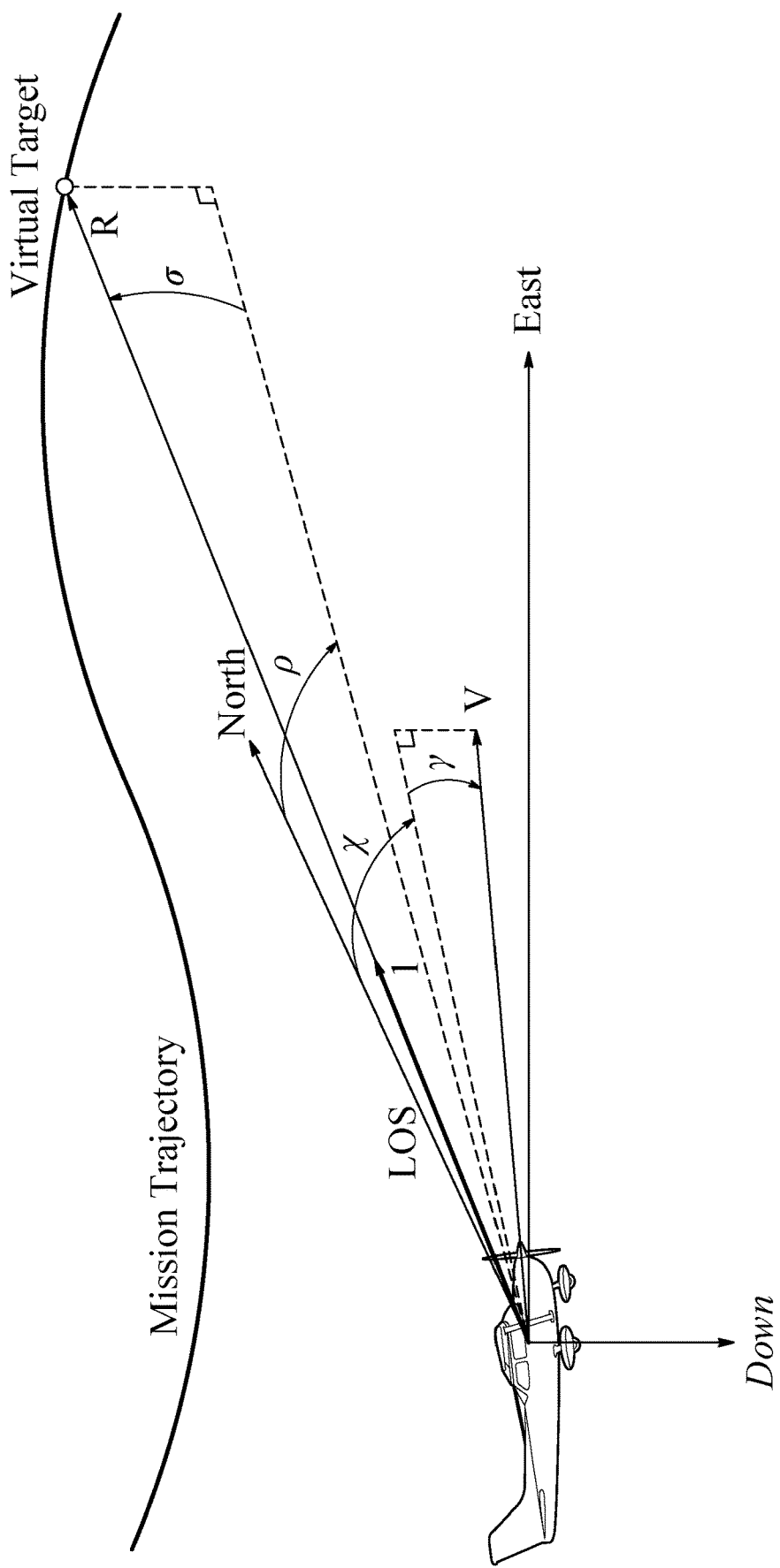
FIG. 10 is a perspective view of an exemplary aircraft, further showing a line-of-sight vector and a velocity vector of the aircraft with respect to a mission trajectory of the aircraft.

As shown in (31), the components $\rho$ and $\sigma$ indicate the orientation in the inertial frame. Such orientation is called the LOS vector, which is defined as $LOS=[l_1 \ l_2 \ l_3]^T$ whose three components are shown as below $$l_1 = \cos \rho \cos \sigma$$

$$l_2 = \sin \rho \cos \sigma$$

$$l_3 = -\sin \sigma \quad (32)$$

where $l_1$, $l_2$ and $l_3$ are the three-dimensional normalized coordinates in the NED Cartesian frame. As shown in FIG. 10, the LOS vector is determined by the azimuth angle and the elevation angle of the range vector described in (30), but with the normalized magnitude. On the other hand, the aircraft inertial velocity vector $V=[\dot{x} \ \dot{y} \ \dot{z}]^T$ is represented using the flight course components as $$\dot{x} = V \Omega \cos \gamma$$

$$\dot{y} = V \sin \Omega \cos \gamma$$

$$\dot{z} = -V \sin \gamma \quad (33)$$

where the $\chi$ is the heading angle and $\gamma$ is the flight-path angle, respectively; V is the inertial vehicle velocity magnitude. FIG. 10 also shows the vehicle velocity vector and its flight-path components in the inertial frame.

Figure 11:
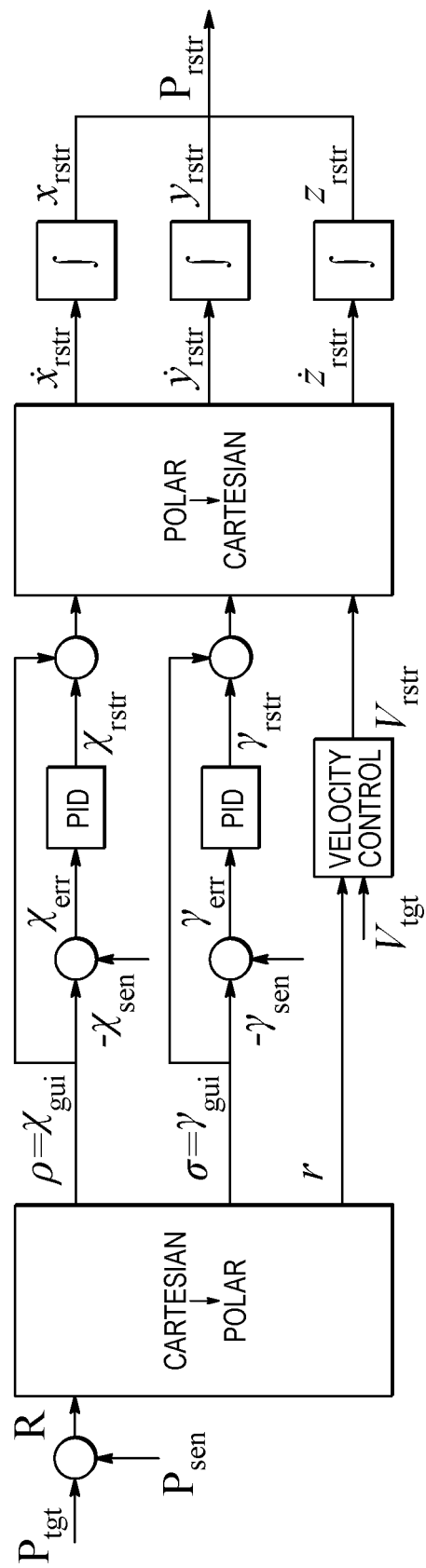
FIG. 11 is a block diagram illustrating a steering control for a restoration mode in accordance with an aspect of the invention.

The PPG trajectory design is to align the vehicle velocity vector with the LOS by steering and accelerating the vehicle. The Restoration Trajectory block in FIG. 9 can be expanded as shown in FIG. 11, in which the first two channels are used for orientation regulation, and the third channel is dedicated to velocity control according to the distance and the target velocity, which are described below.

With respect to orientation control, as shown in FIG. 10, the vehicle's velocity vector is regulated to point to the target direction indicated by LOS in (33). Therefore, the azimuth and elevation angles $\rho$ and $\sigma$ and a that determine the LOS vector in (31) and (32) are employed as the guidance commands for the close-in orientation design $$\chi_{gui} = \rho, \gamma_{gui} = \sigma \quad (34)$$

and the following PID control laws are designed as:

$$\chi_{rstr} = K_{P_\chi} \chi_{err} + K_{I_\chi} \int_0^t \chi_{err}(\tau) d\tau + K_{D_\chi} \dot{\chi}_{err}$$

$$\gamma_{rstr} = K_{P_\gamma} \gamma_{err} + K_{I_\gamma} \int_0^t \gamma_{err}(\tau) d\tau + K_{D_\gamma} \dot{\gamma}_{err} \quad (35)$$

where $\chi_{err} = \chi_{gui} - \chi_{sen}$ and $\gamma_{err} = \gamma_{gui} - \gamma_{sen}$ are the feedback tracking errors for the heading angle channel and the flight-path angle channel, respectively, which are both assumed to be sufficiently small, which is satisfied with the vehicle behind the target with a large range and relatively small altitude and horizontal course deviation; $\chi_{sen}$ and $\gamma_{sen}$ are the sensed vehicle heading angle and flight-path angle, respectively; and the $\chi_{rstr}$ and $\gamma_{rstr}$ are the feedback control variables for the close-in trajectory generation.

With respect to velocity control, the velocity command comprises two sources: the distance r and the inertial speed of the virtual target $V_{tgt}$. At the end of the restoration, the vehicle velocity should be the same as the target speed $V_{tgt}$. Regarding the initial value setting for the integrators in the controller, at the nominal flight restoration control mode triggering moment when $t=t_r$, which is also the end of the arrest, even though the position command is set to $P_{com}=P_{rstr}$, the internal states of the controller are not consistent with those induced by $P_{rstr}$. Therefore, the velocity vector of the restoration guidance trajectory $P_{rstr}$ is initialized at $V_{sen}(t_r)$ to guide the velocity for 5s, as shown in Eq. (36). This phase is called coast, which effectively avoids the throttle saturation induced by excessive controller transient.

$$V_{ref} = \begin{cases} V_{sen}, & t_{rstr} \leq t \leq t_{rstr} + 5 \\ V_{tgt}, & t > t_{rstr} \end{cases} \quad (36)$$

After the controller is initialized, vector $v_{tgt}$ is employed to guide the vehicle by the pure pursuit guidance law, which allows the Line-of-Sight (LOS) tracking to converge first while maintaining a constant range. Once the LOS errors $|y_e|$ and $|z_e|$ are sufficiently reduced to within a threshold?', where?' is determined by the maximum thrust of the aircraft, the guidance velocity $V_{ref}$ is increased for the vehicle to close-in onto the target based on the range by $$V_r = \begin{cases} sat(r-1)k_r, & |y_e| < \delta \ \& \ |z_e| < \delta \\ 0, & \text{Otherwise} \end{cases} \quad (37)$$

where the saturation function on the range is set to, for instance, 2 m/s depending on the maximum thrust of the aircraft, which limits the maximum increase in velocity due to the range error. It will be appreciated that this is an exemplary value only and may be different depending on the particular aircraft. The range induced acceleration is applied only when the range is larger than 1 m. Therefore, the guidance velocity decreases to $V_{ref}=V_{tgt}$ as the range is reduced to less than 1m in preparation for home-in. Accordingly, the guidance velocity control considering the mode switching mechanism is given as follows $$\dot{v}_{rstr} = K_V(V_{ref} + V_r - V_{rstr}) \quad (38)$$

Figure 12:
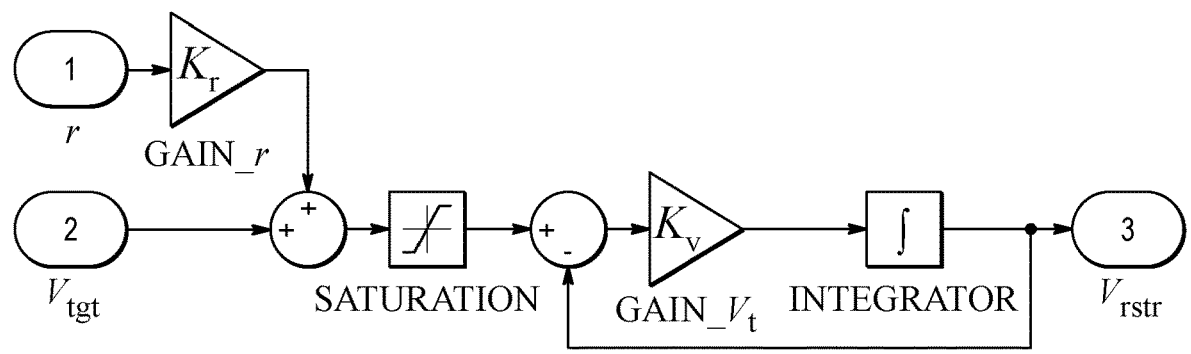
FIG. 12 is a block diagram illustrating a velocity control for a restoration mode in accordance with an aspect of the invention.

Then the Velocity Control block in FIG. 11 can be expanded as follows for the principle illustration and implementation as shown in FIG. 12. By the orientation $\chi_{rstr}$ and $\gamma_{rstr}$, and the velocity control $V_{rstr}$ designs above, the guidance trajectory for mission restoration can be obtained by integrating the following inertial velocity in Cartesian coordinate as $$\dot{x}_{rstr} = V_{t,rstr} \cos \chi_{rstr} \cos \gamma_{rstr}$$

$$\dot{y}_{rstr} = V_{t,rstr} \sin \chi_{rstr} \cos \gamma_{rstr}$$

$$\dot{z}_{rstr} = V_{t,rstr} \sin \gamma_{rstr} \quad (39)$$

The restoration trajectory $P_{rstr} = [x_{rstr} \ y_{rstr} \ z_{rstr}]^T$ is then planned for the nominal controller to track. When the position tracking error between the vehicle and the target converges to within the boundaries indicated by the capture range box defined in (40), the close-in control is finished.

$$N = \{R: R_N \in [-1,1], R_E \in [-1,1], R_D = [-1,1]\} \quad (40)$$

It will be appreciated that the values shown in Eq. (40) are exemplary only and that other values may be used depending on the particular aircraft.

3. Home-in Control

After (40) is satisfied, the multi-modal controller is configured by switching the flag from value 3 to 0 as shown in Table 5 and FIG. 9, such configuration indicating that the mission trajectory $P_{tgt}$ is restored. This section presents the second phase of mission restoration called home-in, which is designed for restoring the mission trajectory tracking precision.

At the end of the close-in sub-mode, there is still an amount of tracking error which is beyond the capability of the nominal tracking precision indicated by $\omega_{n,ij,nom}$, which is provided by desired tracking performance and reasonable system robustness. In this case, the robustness of the system needs to be increased to guarantee the system stability in order to accommodate the existing tracking error, then gradually restore the desired tracking performance. In order to trade off between the tracking performance and the system robustness, the single-parameter adaptation law described for the LOC prevention control mode is employed for the home-in sub-mode $$\omega_{n,ij}(t)=k_a(t)\omega_{n,ij,nom}, i=1,2,3,4, j=1,2,3 \quad (41)$$

Figure 13:
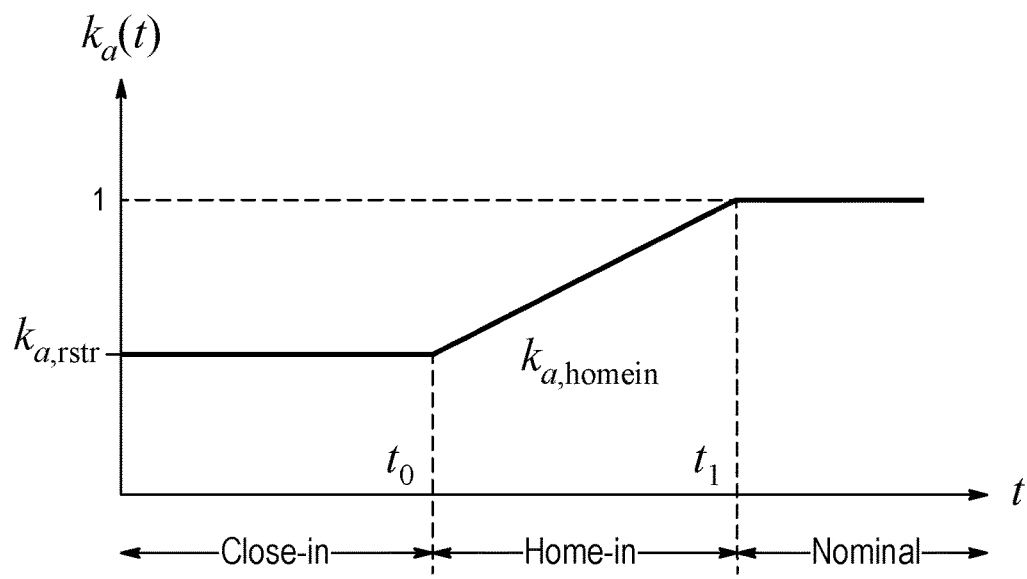
FIG. 13 is a graph illustrating a bandwidth adaptation law for a nominal mode, a close-in sub-mode, and a home-in sub-mode, in accordance with an aspect of the invention.

Based on the bandwidth adaptation philosophy shown in FIG. 13, a bandwidth adaptation law is implemented to the nominal controller according to (41) for a smooth transition to the nominal configuration. As shown in FIG. 13, the system bandwidth of the 6DOF nominal controller is adapted by $k_{a,rstr}(t)$, which is a moderate value in $(0,1)$ to ensure an adequate robustness and tracking performance for the close-in sub-mode. Such bandwidth adaptation gain is also the initial value for time-varying home-in gain $k_{a,homein}(t_0)=k_{a,rstr}(t)$, where $t_0$ indicates the moment that the system configuration switches to the home-in sub-mode. During the home-in sub-mode, the adaptation gain increases gradually in order to increase the tracking performance. Once $k_{a,homein}(t)$ is increased to the value 1 at $t_1$, the nominal mission is restored completely. The system under the application of its tuned-up bandwidth for the trajectory tracking mission.

H. Automatic Flight Management System (AFMS)

Figure 14:
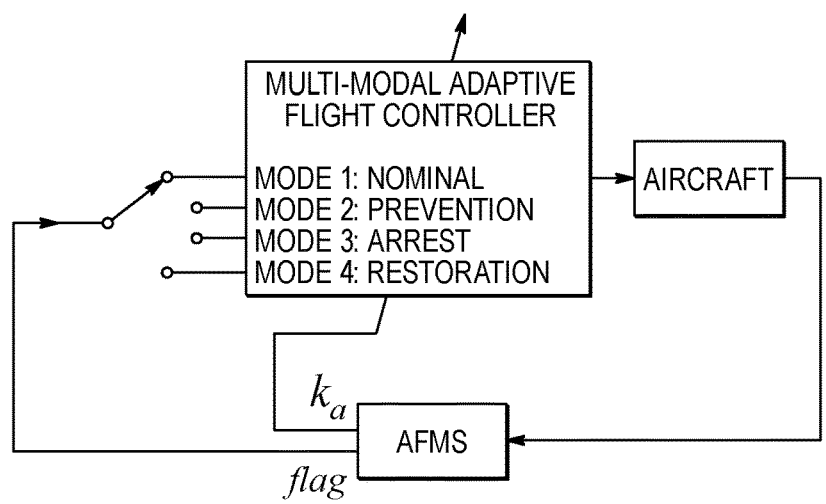
FIG. 14 is a block diagram of an autonomous flight management system that integrates the multimodal adaptive flight controller for Loss-of-Control Prevention and Recovery in accordance with an aspect of the invention.

As previously mentioned, in one embodiment the invention provides an Autonomous Flight Management System (AFMS). An exemplary AFMS scheme is shown in FIG. 14. The AFMS may act as a supervisory control system which is capable of decision making and coordination of the different control modes according to the flight conditions of the aircraft. In other words, the supervisory control system is capable of monitoring the flight states and flight events of the aircraft and determining which flight control mode to activate or implement. The iLOCPR system is characterized by a set of one or more of the aforementioned control modes under the supervisory control of the AFMS.

Designed on the top level, the supervisory control AFMS has the switching logic variable "flag" as one of its output, whose value is set according to the real-time flight states and flight events. Each of the control modes corresponds to one flag value in the hybrid system finite state machine and can be transitioned automatically from one to another under specific conditions. Another output of the AFMS is the bandwidth adaptation gain, which is designed for the bandwidth augmentation under the specific control objectives for each mode. The bandwidth adaptation scheme is designed based on the PD-eigenvalue theory, where the bandwidth of the multiple-nested-loop system can be adapted to make the tradeoff between the tracking performance and the system robustness.

Figure 15:
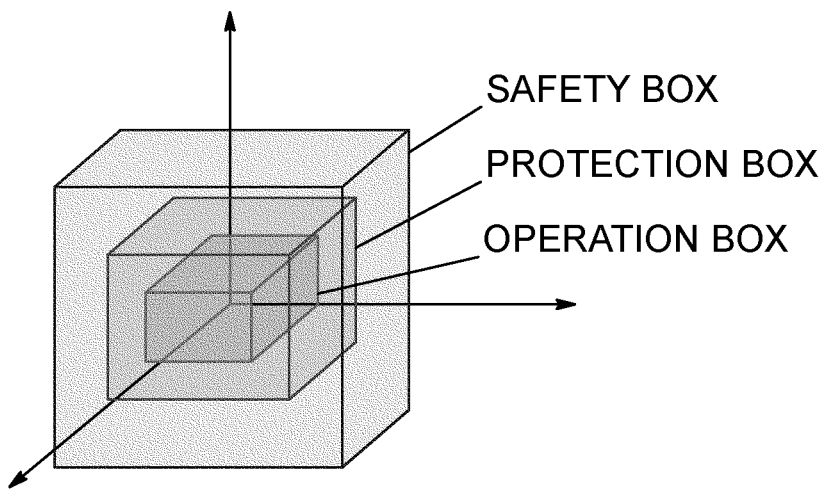
FIG. 15 is a graph illustrating the definition of aircraft flight state threshold sets in accordance with an aspect of the invention.
Figure 16:
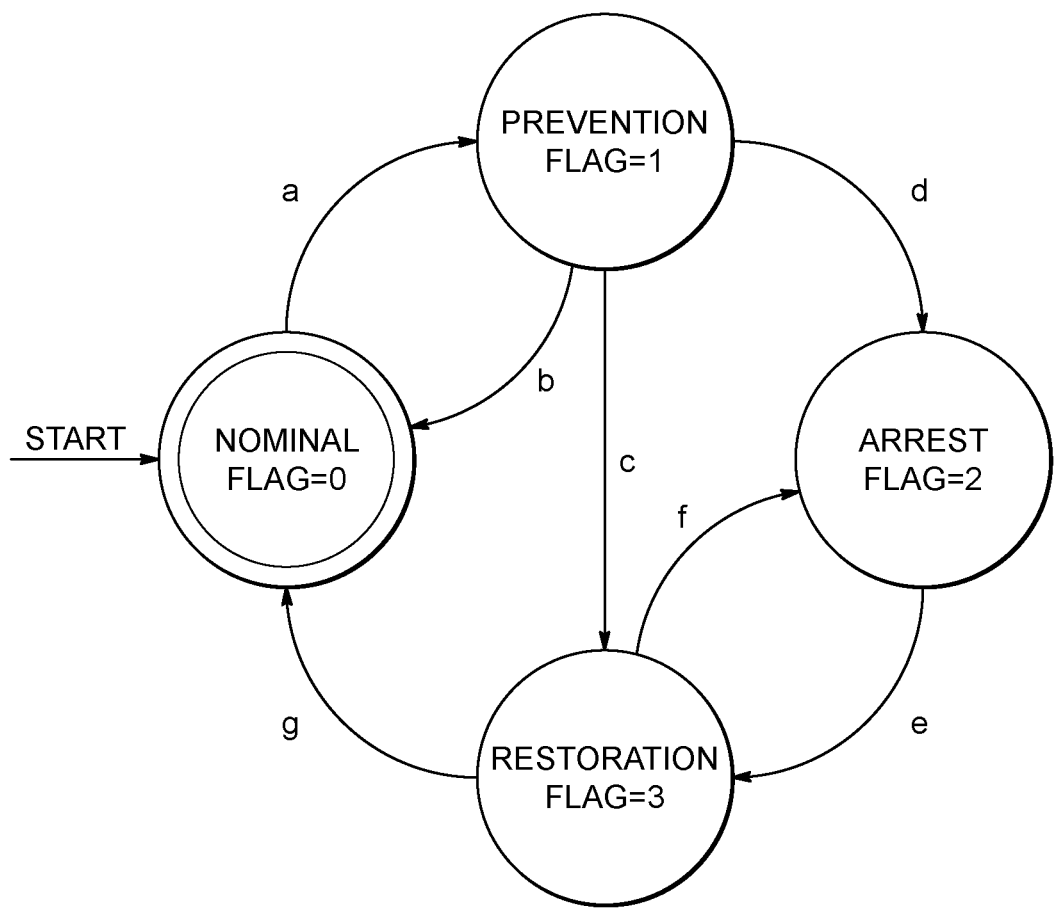
FIG. 16 is a block diagram illustrating interrelationships between nominal, prevention, loss-of-control arrest, and restoration modes, and the mode transition logics, in accordance with an aspect of the invention.

The design of the AFMS finite-state machine entails specifying on the threshold boxes for the flight mode determination as illustrated in FIG. 15 and the state transition predicates shown in FIG. 16 and Table 6.

1. Quantification

Since an upset is the direct consequence of aerodynamic attitude exceedance of the normal flight envelope, the aerodynamic attitude is essential as a LOC indicator. In addition, angular rates also constitute a LOC indicator, as they must be kept within a certain range to prevent the wings and control surfaces from unbalanced stall induced by abnormal airflow. Another indicator is the airspeed, as stall will occur below the critical airspeed. Therefore, the vehicle safety can be described by three sets of thresholds, which consist of the extremities of aerodynamic attitude, angular rates, and airspeed as shown in FIG. 15. The "operation box" is defined by the thresholds as $$O_1=\{\Lambda: \alpha\in[-2°,5°], \beta\in[-5°,5°], \mu=[-20°,20°]\}$$

$$O_2=\{\Omega: p,q,r\in[-20 \text{ deg/sec}, 20 \text{ deg/sec}]\}$$

$$O_3=\{V_1\in[1.5V_{t,stall}, V_{t,max}]\} \quad (42)$$

where $\Lambda=[\alpha\ \beta\ \mu]^T$ are the aerodynamic angles, i.e. angle-of-attack, sideslip and bank angle respectively; $\Omega=[p\ q\ r]^T$ are the body-axis roll, pitch, yaw rotational rate; and v, is the airspeed. The values shown in Eq. (42) are exemplary only and may be different depending on the particular aircraft. The operation box bounds the healthy flight state variables under the nominal mode. The "protection box" defines a buffer (hysteresis) zone between the nominal and LOC arrest mode up to the maximum allowable flight conditions as shown in Eq. (43) as $$P_1 = \left\{ \begin{array}{l} \Lambda: \alpha \in 0.6\times[-5°, 15°], \beta \in 0.6\times[-10°, 10°], \\ \mu = 0.6\times[-45°, 45°] \end{array} \right\} \quad (43)$$

$$P_2 = \{\Omega: p, q, r \in 0.6\times[-60 \text{ deg/sec}, 60 \text{ deg/sec}]\}$$

$$P_3 = \{V_t \in 0.6\times[V_{t,stall}, V_{t,max}]\}$$

The values shown in Eq. (43) are exemplary only and may be different depending on the particular aircraft. The "safety box" is defined by the extremities of aerodynamic angles, angular rates and airspeed given in Eq. (44) such that LOC will be declared when any one of them is exceeded.

$$S_1=\{\Lambda: \alpha\in[-5°,15°], \beta\in[-10°,10°], \mu=[-45°,45°]\}$$

$$S_2=\{\Omega: p,q,r\in[-60 \text{ deg/sec}, 60 \text{ deg/sec}]\}$$

$$S_3=\{V_t\in[V_{t,stall}, V_{t,max}]\} \quad (44)$$

It is noted that the specific values of aerodynamic angles, angular rates, and airspeed used in Eq. (42-44) to define the flight conditions are exemplified here based on typical wind-tunnel flight data and LOC studies. In addition, a small range (position error between the target and the vehicle) box for the home-in sub-mode and a large range box for the restoration mode are defined respectively $$R_{small}=\{R: \sqrt{R_N^2+R_E^2+R_D^2} \leq 1\}$$

$$R_{med}=\{R: 1 < \sqrt{R_N^2+R_E^2+R_D^2} \leq 50\}$$

$$R_{large}=\{R: \sqrt{R_N^2+R_E^2+R_D^2} > 50\} \quad (45)$$

In practice, these threshold boxes should be defined on a case-by-case basis for the specific aircraft model and FIG. 15 simply provides a visual representation using 3D boxes.

The supervisory control logic variable is then determined by $$\text{flag} = \begin{cases} 0, & \Lambda \in O_1 \text{ AND } \Omega \in O_2 \text{ AND } V_t \in O_3 \text{ AND range} \in R_{small} \\ 1, & \Lambda \in P_1 \setminus O_1 \text{ AND } \Omega \in P_2 \setminus O_1 \text{ AND } V_t \in P_3 \setminus O_3 \\ 2, & \Lambda \neq S_1 \text{ OR } \Omega \notin S_2 \text{ OR } V_t \notin S_3 \\ 3, & \text{AND } \Lambda \in O_1 \text{ AND } \Omega \in O_2 \text{ AND } V_t \in O_3 \text{ AND range} \in R_{large} \end{cases} \quad (46)$$

in which the flag=0 value is set as long as the operation box defined in Eq. (42) is satisfied. The corresponding state for flag=0 is the nominal flight control mode. If any flight condition exceeds the operation box, while all of the indicating flight conditions still stay in the protection box defined in Eq. (43), flag=1, and the LOC prevention control mode is engaged. If any of the flight conditions exceeds the safety box defined in Eq. (44), flag=2, which indicates the engagement of the LOC arrest control mode. When all the flight conditions return to inside of the operation box in Eq. (42) and large position error $R_{large}$ occurs by Eq. (45), flag=3 is set for the engagement of the nominal flight restoration control mode. When the $R_{small}$ is recovered and all the flight states are within the operation box, the nominal flight control mode is reset with flag=0.

2. Mode Transition

The AFMS is designed as a Moore finite-state machine. The interrelationships among each discrete mode are captured in the state transition diagram in FIG. 16.

TABLE 6

Transition and Condition for Finite-State Machine.

| Transition | Condition |
| --- | --- |
| a | Exceed the protection box. |
| b | Inside the operation box, small range error. |
| c | Inside the safety box, large range error. |
| d | Exceed the safety box. |
| e | Inside the operation box, large range error. |
| f | Exceed the safety box. |
| g | Inside the operation box, small range error. |

Transition a: Nominal→Prevention

The nominal flight control mode (flag=0) is the default mode when the system is initialized. The LOC prevention control mode (flag=1) will not be turned on until the operation box is exceeded, while all states are inside the protection box, in which case the transition a is made and the LOC prevention control mode is enabled.

Transition b: Prevention→Nominal

By applying the LOC prevention control mode, if the operation box is recovered and the range loss (position tracking error) is small, the transition is triggered to enable the nominal flight control mode.

Transition c: Prevention→Restoration

If the prevention process causes a large range loss, the transition c is triggered to enable the nominal flight restoration control mode.

Transition d: Prevention→Arrest

LOC is declared when the safety box is exceeded. Moreover, at that time, the transition d is triggered to engage the LOC arrest control mode (flag=2).

Transition e: Arrest→Restoration

On the other hand, when the operation box is successfully recovered by the LOC arrest control mode with a large range error, the transition e is made to trigger the nominal flight restoration control mode (flag=3).

Transition f: Restoration→Arrest

During the nominal flight restoration control mode, if the safety box is exceeded again, the LOC arrest control mode is triggered by the transition f.

Transition g: Restoration→Nominal

After recovering the operation box, and range loss (position tracking error) is reduced by the nominal flight restoration control mode to within the $R_{small}$ given in Eq. (45), the transition g is made. The nominal flight control mode is restored.

3. Multi-Modal Controller Integration

The multi-modal controller diagram is shown in FIG. 9. The nominal flight control mode is designed to execute the mission trajectory-tracking task. The LOC prevention control mode is designed by a bandwidth adaptation augmentation to the nominal flight control mode to trade off tracking performance with increased stability margin and robustness in the presence of LOC-prone flight conditions. In other words, tracking performance is sacrificed in order to increase the capability of tolerance for severe wind and other abnormalities in real time. The LOC arrest control mode is designed to switch from the mission trajectory-tracking task to aerodynamic attitude trajectory tracking task for LOC arrest in order to recover and maintain healthy flight condition at the cost of temporarily abandoning the mission trajectory. In the nominal flight restoration control mode, a guidance trajectory $P_{rstr}$ is generated to direct the vehicle back to the mission trajectory after the successful arrest of a LOC upset and then restore the tracking performance.

FIG. 14 shows the multi-modal controller configuration under the AFMS including the supervisory control flag value for configuring each control mode, the bandwidth adaptation gain $k_a$ designed for each control mode, and FIG. 9 shows the corresponding command trajectory, controller, feedback variables, and controller outputs. The system configuration can also be described as shown in Table 7.

TABLE 7

Multi-Modal Controller Configuration.

| Mode | Nominal | Prevention | Arrest | Restoration |
| --- | --- | --- | --- | --- |
| flag | 0 | 1 | 2 | 3 |
| $k_a$ | 1 | $k_{a,prev}$ | $k_{a,arst}$ | $k_{a,rstr}$ |
| Trajectory | $P_{tgt}$ | $P_{tgt}$ | $\Lambda_{arst}$ | $P_{rstr}$ |
| Controller | Baseline | Baseline | Arrest | Baseline |
| Feedback Variable | $P_{sen}, V_{sen},$ $\Gamma_{sen}, \Omega_{sen}$ | $P_{sen}, V_{sen},$ $\Gamma_{sen}, \Omega_{sen}$ | $\Lambda_{sen}, \Omega_{sen}$ | $P_{sen}, V_{sen},$ $\Gamma_{sen}, \Omega_{sen}$ |
| Controller Output | $\Delta_{com}, \delta_{\tau,com}$ | $\Delta_{com}, \delta_{\tau,com}$ | $\Delta_{arst}, \delta_{\tau,arst}$ | $\Delta_{com}, \delta_{\tau,com}$ |

4. Nominal Flight Control Mode Configuration

As shown in Table 7, the baseline TLC 6DOF controller is engaged to achieve the mission trajectory tracking goal.

Regarding the supervisory control, the nominal flight control mode corresponds to the supervisory control flag=0 and $k_a$=1. The nominal flight control mode aims to achieve the desired tracking performance with the tuned nominal bandwidth parameters without the bandwidth adaptation.

With respect to baseline controller engagement, when the baseline controller is engaged, the mission trajectory is selected to be the control objective under nominal flight control mode by applying $P_{com}=P_{tgt}$. The feedback states $P_{sen}$, $V_{sen}$, $\Gamma_{sen}$, $\Omega_{sen}$ are utilized to calculate the feedback stabilizing TLC gain matrices in real time. And the corresponding command trajectories for the baseline controller are configured as $$V_{com}=V_{nom}+V_{ctrl}, \Gamma_{com}=\Gamma_{nom}+\Gamma_{ctrl}$$

$$\Omega_{com1}=\Omega_{nom1}+\Omega_{ctrl1}, T_{m,com1}=T_{m,nom1}+T_{m,ctrl1} \quad (47)$$

where the command variables are obtained by adding the closed-loop PI feedback tracking error control with subscript "ctrl" to the nominal control with subscript "nom" from dynamic pseudo-inversion. In this case, the controller outputs $[\Delta_{com}, \delta_{\alpha,com}]$ are selected.

With respect to LOC arrest control mode disengagement, meanwhile, the LOC arrest control mode is on standby by setting the aerodynamic attitude tracking command and the ensuing body rate command equal to the sensed flight states as $$\Lambda_{com}=\Lambda_{sen}, \Omega_{com2}=\Omega_{sen} \quad (48)$$

so that the integrators in the LOC arrest control mode are put on hold by setting zero tracking errors as $\Lambda_{err}=\Lambda_{sen}-\Lambda_{com}=0$, $\Omega_{err2}=\Omega_{sen}-\Omega_{com2}=0$.

Regarding the initial value setting for the integrators in the controller, the default controller mode is the nominal flight control mode. The initial values of the integrators of the baseline controller $P_{ini}$, $V_{ini}$, $\Gamma_{ini}$, $\Omega_{ini1}$ and the LOC arrest control mode $\Lambda_{ini}$, $\Omega_{ini2}$ are obtained by a trim flight condition.

5. LOC Prevention Control Mode Configuration

As shown in Table 7, the baseline controller is also employed for LOC prevention control mode.

Regarding the supervisory control, the LOC prevention control mode is in accordance with the supervisory control law as flag=1. The LOC prevention adaptation law $k(t)_{a,prev}$ is applied to the baseline controller in order to a tradeoff between the tracking performance and the system robustness.

With respect to baseline controller engagement, the baseline controller is engaged. The mission trajectory, feedback states, command variables for each loop, and the controller outputs are set to be the same as the ones for the nominal flight control mode.

With respect to LOC arrest control mode disengagement, the LOC arrest control mode remains on standby by Eq. (48).

Regarding the initial value setting for the integrators in the multi-modal controller, in the LOC prevention control mode, all the state values for the integrators are inherited from the nominal flight control mode. Integrators of the LOC arrest control mode are storing the feedback states from the sensing system in preparation for a LOC.

6. LOC Arrest Control Mode Configuration

The baseline controller is disengaged for LOC arrest control mode, while the LOC arrest control mode is armed.

Regarding the supervisory control, once LOC is detected, the supervisory control is set as flag=2. The bandwidth adaptation $k(t)_{a,arst}$ is applied for different LOC conditions.

With respect to baseline controller disengagement, the nominal flight control mode is disarmed by the following setting $$P_{com}=P_{sen}, V_{com}=V_{sen}, \Gamma_{com}=\Gamma_{sen}, \Omega_{com1}=\Omega_{sen} \quad (49)$$

which implies that all the integrators in the nominal control feedback loop are frozen by taking in zero tracking errors, since $$P_{err}=P_{sen}-P_{com}=0, V_{err}=V_{sen}-V_{com}=0,$$

$$\Gamma_{err}=\Gamma_{sen}-\Gamma_{com}=0, \Omega_{err1}=\Omega_{sen}-\Omega_{com1}=0 \quad (50)$$

With respect to LOC arrest control mode engagement, the LOC arrest control mode is taking control of the system, in which $\Lambda_{arst}$ is the command for arresting the LOC.

$$\Lambda_{com}=\Lambda_{arst}, \Omega_{com2}=\Omega_{nom2}+\Omega_{ctrl2} \quad (51)$$

The control outputs $[\Delta_{arst}, \delta_{\tau,arst}]$ are selected.

Regarding the initial value setting for the integrators in the controller, the LOC arrest control mode is properly initialized by the sensed states of $\Lambda_{sen}$ and $\Omega_{sen}$ at the switching time so that switching transient or instability caused by excessive inertial tracking error is avoided.

7. Nominal Flight Restoration Control Mode Configuration

The baseline controller is engaged for nominal flight restoration control mode.

Regarding the supervisory control, the nominal flight restoration control mode corresponds to the supervisory control flag=3. The bandwidth adaptation gain $k_{a,rstr}(t)$ is applied to increase the tracking error tolerance capability.

With respect to baseline controller engagement, the baseline controller is engaged. The mission trajectory is set to $P_{com}=P_{rstr}$. Otherwise, all feedback states, command variables for each loop and the controller outputs are set to be the same as the ones for the nominal mode design.

With respect to LOC arrest control mode disengagement, the arrest controller is disarmed by satisfying the Eq. (48).

Regarding the initial value setting for the integrators in the controller, at the restoration mode triggering moment when $t=t_r$, which is also the end of the arrest, even though the position command is set to $P_{com}=P_{rstr}$, the internal states of the controller are not consistent with those induced by $P_{rstr}$. Therefore, the velocity vector of the restoration guidance trajectory $P_{rstr}$ is initialized at $V_{sen}(t_r)$ to guide the velocity for 5s, as shown in Eq. (36). This phase is called coast, which effectively avoids the throttle saturation induced by excessive controller transient.

8. State Equation and Controller State

Additional details of designing the multi-modal controller shown as in FIG. 9 can be found in the '966 patent in accordance with the value of the supervisory signal flag.

Also, the state equations for the controller and the vehicle equation-of-motions are summarized in Tables 8-10, in which the coefficient matrices of the pseudo-differentiator is given as $$A_{diff,i} = \begin{bmatrix} O_3 & I_3 \\ A_{21,i} & A_{22,i} \end{bmatrix}, \quad (52)$$

$$B_{diff,i} = \begin{bmatrix} O_3 \\ -A_{21,i} \end{bmatrix},$$

$$i = 1, 2, 3, 4, 5, 6$$

$$A_{21,i} = \text{diag}[\ -\omega_{n,diff,ij}^2 \quad -\omega_{n,diff,ij}^2 \quad -\omega_{n,diff,ij}^2\ ]$$

$$A_{22,i} = \text{diag}[\ -2\zeta_{diff,ij}\omega_{n,diff,ij} \quad -2\zeta_{diff,ij}\omega_{n,diff,ij} \quad -2\zeta_{diff,ij}\omega_{n,diff,ij}\ ]$$

where i represents the loop number, and j represents the channel number.

TABLE 8

Baseline Controller State Equations.

| | |
|---|---|
| $P_{com}$ | $P_{nom} = P_{com}$ |
| $P_{nom}, \dot{P}_{nom}$ | $\begin{bmatrix} \dot{P}_{nom} \\ \ddot{P}_{nom} \end{bmatrix} = A_{diff,1} \begin{bmatrix} P_{nom} \\ \dot{P}_{nom} \end{bmatrix} + B_{diff,1} P_{com}$ |
| GON | $V_{nom} = B_1^{-1}(\Gamma_{nom})\dot{P}_{nom}$ |
| $P_{err}$ | $P_{err} = P_{sen} - P_{com}$ |
| GOF | $V_{ctrl} = -K_{P1}P_{err} - K_{I1}\int_{t_0}^{t} P_{err}(\tau)d\tau$ |
| $V_{com}$ | $V_{com} = V_{nom} + V_{ctrl}$ |
| $V_{nom}, \dot{V}_{nom}$ | $\begin{bmatrix} \dot{V}_{nom} \\ \ddot{V}_{nom} \end{bmatrix} = A_{diff,2} \begin{bmatrix} V_{nom} \\ \dot{V}_{nom} \end{bmatrix} + B_{diff,2} V_{nom}$ |
| GIN | $F_{nom} = m[\dot{V}_{nom} - B_2(\Omega_{nom})V_{nom}]$ |
| $V_{err}$ | $V_{err} = V_{sen} - V_{com}$ |
| GIF | $F_{ctrl} = -K_{P2}V_{err} - K_{I2}\int_{t_0}^{t} V_{err}(\tau)d\tau$ |
| GAN | $\Gamma_{nom} = f_2(F_{nom})$ |
| GAC | $\Gamma_{com} = f_2(F_{com})$ |
| $\Gamma_{nom}, \dot{\Gamma}_{nom}$ | $\begin{bmatrix} \dot{\Gamma}_{nom} \\ \ddot{\Gamma}_{nom} \end{bmatrix} = A_{diff,3} \begin{bmatrix} \Gamma_{nom} \\ \dot{\Gamma}_{nom} \end{bmatrix} + B_{diff,3}\Gamma_{nom}$ |
| EON | $\Omega_{nom} = B_3^{-1}(\Gamma_{nom})\dot{\Gamma}_{nom}$ |
| $\Gamma_{err}$ | $\Gamma_{err} = \Gamma_{sen} - \Gamma_{com}$ |
| EOF | $\Omega_{ctrl} = -K_{P3}\Gamma_{err} - K_{I3}\int_{t_0}^{t}\Gamma_{err}(\tau)d\tau$ |
| $\Omega_{com1}$ | $\Omega_{com1} = \Omega_{nom1} + \Omega_{ctrl1}$ |
| $\Omega_{nom1}, \dot{\Omega}_{nom1}$ | $\begin{bmatrix} \dot{\Omega}_{nom1} \\ \ddot{\Omega}_{nom1} \end{bmatrix} = A_{diff,4}\begin{bmatrix} \Omega_{nom1} \\ \dot{\Omega}_{nom1} \end{bmatrix} + B_{diff,4}\Omega_{nom1}$ |
| EIN | $T_{m,nom1} = B_4^{-1}[\dot{\Omega}_{nom1} - f_4(\Omega_{nom1})]$ |
| $\Omega_{err1}$ | $\Omega_{err1} = \Omega_{sen} - \Omega_{com1}$ |
| EIF | $T_{m,ctrl1} = -K_{P4}\Omega_{err1} - K_{I4}\int_{t_0}^{t}\Omega_{err1}(\sigma)d\sigma$ |
| $T_{m,com1}$ | $T_{m,com1} = T_{m,nom1} + T_{m,ctrl1}$ |
| EA | $\Delta_{com} = J^{-1}T_{allo1}$ |

TABLE 9

LOC Arrest Control Mode State Equations.

| | |
|---|---|
| $\Lambda_{rstr}$ | $\Lambda_{nom} = \Lambda_{rstr}$ |
| $\Lambda_{nom}, \dot{\Lambda}_{nom}$ | $\begin{bmatrix} \dot{\Lambda}_{nom} \\ \ddot{\Lambda}_{nom} \end{bmatrix} = A_{diff,5}\begin{bmatrix} \Lambda_{nom} \\ \dot{\Lambda}_{nom} \end{bmatrix} + B_{diff,5}\Lambda_{rstr}$ |
| $\Lambda_{err}$ | $\Lambda_{err} = \Lambda_{sen} - \Lambda_{rstr}$ |
| AOF | $\Omega_{ctrl2} = -K_{P6}\Lambda_{err} - K_{I6}\int_{t_0}^{t}\Lambda_{err}(\tau)d\tau$ |
| $\Omega_{com2}$ | $\Omega_{com2} = \Omega_{nom2} + \Omega_{ctrl2}$ |
| $\Omega_{nom2}, \dot{\Omega}_{nom2}$ | $\begin{bmatrix} \dot{\Omega}_{nom2} \\ \ddot{\Omega}_{nom2} \end{bmatrix} = A_{diff,6}\begin{bmatrix} \Omega_{nom2} \\ \dot{\Omega}_{nom2} \end{bmatrix} + B_{diff,6}\Omega_{nom2}$ |
| AIN | $T_{m,nom2} = B_4^{-1}[\dot{\Omega}_{nom2} - f_4(\Omega_{nom2})]$ |
| $\Omega_{err2}$ | $\Omega_{err2} = \Omega_{sen} - \Omega_{com2}$ |
| AIF | $T_{m,ctrl2} = -K_{P4}\Omega_{err2} - K_{I4}\int_{t_0}^{t}\Omega_{err2}(\sigma)d\sigma$ |
| $T_{m,com2}$ | $T_{m,com2} = T_{m,nom2} + T_{m,ctrl2}$ |
| AA | $\Delta_{arst} = J^{-1}T_{allo2}$ |

TABLE 10

Nominal Flight Restoration Control Mode State Equations.

| | |
|---|---|
| $P_{err}$ Spherical coordinate | $\rho = \arctan\left(\dfrac{R_E}{R_N}\right)$ |
| | $\sigma = -\arcsin\left(\dfrac{R_D}{r}\right)$ |
| | $r = \sqrt{R_N^2 + R_E^2 + R_D^2}$ |
| $\gamma_{err}, \dot{\gamma}_{err}$ | $\begin{bmatrix} \dot{\gamma}_{err} \\ \ddot{\gamma}_{err} \end{bmatrix} = \begin{bmatrix} 0 & 1 \\ -\omega_{n,\gamma}^2 & -2\zeta_\gamma \end{bmatrix}\begin{bmatrix} \gamma_{err} \\ \dot{\gamma}_{err} \end{bmatrix} + \begin{bmatrix} 0 \\ \omega_{n,\gamma}^2 \end{bmatrix}\gamma_{err}$ |
| $\chi_{err}, \dot{\chi}_{err}$ | $\begin{bmatrix} \dot{\chi}_{err} \\ \ddot{\chi}_{err} \end{bmatrix} = \begin{bmatrix} 0 & 1 \\ -\omega_{n,\chi}^2 & -2\zeta_\chi \end{bmatrix}\begin{bmatrix} \chi_{err} \\ \dot{\chi}_{err} \end{bmatrix} + \begin{bmatrix} 0 \\ \omega_{n,\chi}^2 \end{bmatrix}\chi_{err}$ |
| Close-in $P_{rstr}$ | $\chi_{rstr} = K_{p,\chi}\chi_{err} + K_{I,\chi}\int_0^t \chi_{err}(\tau)d\tau + K_{D,\chi}\dot{\chi}_{err}$ <br> $\gamma_{rstr} = K_{p,\gamma}\gamma_{err} + K_{I,\gamma}\int_0^t \gamma_{err}(\tau)d\tau + K_{D,\gamma}\dot{\gamma}_{err}$ <br> $V_{rstr} = K_V(V_{ref} + V_r - V_{rstr}) + K_r r$ <br> $\dot{x}_{rstr} = V_{t,rstr}\cos\chi_{rstr}\cos\gamma_{rstr}$ <br> $\dot{y}_{rstr} = V_{t,rstr}\sin\chi_{rstr}\cos\gamma_{rstr}$ <br> $\dot{z}_{rstr} = -V_{t,rstr}\sin\gamma_{rstr}$ |

The initial values of all the dynamic states (integrators) used in the controller design are summarized in Table 11.

TABLE 11

Integrator Initial Value Setting.

| State | Nominal $t = 0$ | Prevention $t = t_p$ | Arrest $t = t_a$ | Restoration $t = t_r$ |
|---|---|---|---|---|
| $\dot{P}_{nom}$ | $V_{trim}$ | $\dot{P}_{nom}(t_p)$ | $V_{sen}(t_a)$ | $V_{sen}(t_r)$ |
| $P_{nom}$ | $P_{trim}$ | $P_{nom}(t_p)$ | $P_{sen}(t_a)$ | $R_{sen}(t_r)$ |
| $P_{err}$ | 0 | $\int_0^{t_p} P_{err}(\tau)$ | 0 | 0 |
| $\dot{V}_{nom}$ | $A_{b,trim}$ | $\dot{V}_{nom}(t_p)$ | $A_{b,sen}(t_a)$ | $A_{b,sen}(t_r)$ |
| $V_{nom}$ | $V_{trim}$ | $V_{nom}(t_p)$ | $V_{sen}(t_a)$ | $V_{sen}(t_r)$ |
| $V_{err}$ | 0 | $\int_0^{t_p} V_{err}(\tau)$ | 0 | 0 |
| $\dot{\Gamma}_{nom}$ | $\Omega_{trim}$ | $\dot{\Gamma}_{nom}(t_p)$ | $\Omega_{sen}(t_a)$ | $\Omega_{sen}(t_r)$ |
| $\Gamma_{nom}$ | $\Gamma_{trim}$ | $\Gamma_{nom}(t_p)$ | $\Gamma_{sen}(t_a)$ | $\Gamma_{sen}(t_r)$ |
| $\Gamma_{err}$ | 0 | $\int_0^{t_p} \Gamma_{err}(\tau)$ | 0 | 0 |
| $\dot{\Omega}_{nom1}$ | $\Theta_{trim}$ | $\dot{\Omega}_{nom1}(t_p)$ | $\Theta_{sen}(t_a)$ | $\Theta_{\omega,sen}(t_r)$ |
| $\Omega_{nom1}$ | $\Omega_{trim}$ | $\Omega_{nom1}(t_p)$ | $\Omega_{sen}(t_a)$ | $\Omega_{sen}(t_r)$ |
| $\Omega_{err1}$ | 0 | $\int_0^{t_p} \Omega_{err1}(\tau)$ | 0 | 0 |
| $\dot{\Lambda}_{nom}$ | 0 | $\dot{\Lambda}_{nom}(t_p)$ | 0 | 0 |
| $\Lambda_{nom}$ | $\Lambda_{sen}(0)$ | $\Lambda_{nom}(t_p)$ | $\Lambda_{arst}(t_a)$ | $\Lambda_{sen}(t_r)$ |
| $\Lambda_{err}$ | 0 | $\int_0^{t_p} \Lambda_{err}(\tau)$ | 0 | 0 |
| $\dot{\Omega}_{nom2}$ | 0 | $\dot{\Omega}_{nom2}(t_p)$ | $\Theta_{arst}(t_a)$ | $\Theta_{\omega,sen}(t_r)$ |
| $\Omega_{nom2}$ | 0 | $\Omega_{nom2}(t_p)$ | $\Omega_{arst}(t_a)$ | $\Omega_{sen2}(t_r)$ |
| $\Omega_{err2}$ | 0 | $\int_0^{t_p} \Omega_{err2}(\tau)$ | 0 | 0 |
| $\chi_{err}$ | 0 | 0 | $\int_{t_p}^{t_a} \chi_{err}(\tau)d$ | $\int_{t_a}^{t_r} \chi_{err}(\tau)$ |

TABLE 11-continued

Integrator Initial Value Setting.

| State | Nominal<br>t = 0 | Prevention<br>t = $t_p$ | Arrest<br>t = $t_a$ | Restoration<br>t = $t_r$ |
|---|---|---|---|---|
| $\gamma_{err}$ | 0 | 0 | $\int_{t_p}^{t_a} \gamma_{err}(\tau)$ | $\int_{t_a}^{t_r} \gamma_{err}(\tau)$ |
| $V_{rstr}$<br>$P_{rstr}$ | $V_{trim}$<br>$P_{trim}$ | $V_{sen}(t_p)$<br>$P_{sen}(t_p)$ | $V_{sen}(t_a)$<br>$P_{sen}(t_a)$ | $V_{sen}(t_r)$<br>$P_{sen}(t_r)$ |

It will be appreciated that each of the modes described herein may be used independently or together in any combination as part of a flight management system. For example, the LOC prevention control, LOC arrest control, and nominal flight restoration control modes may be incorporated into a flight management system having a different baseline controller than the modified TLC 6DOF controller described herein. In another embodiment, the flight management system may not include a nominal flight restoration control mode and may instead rely on the pilot to restore the aircraft to its intended flight path.

Figure 17:
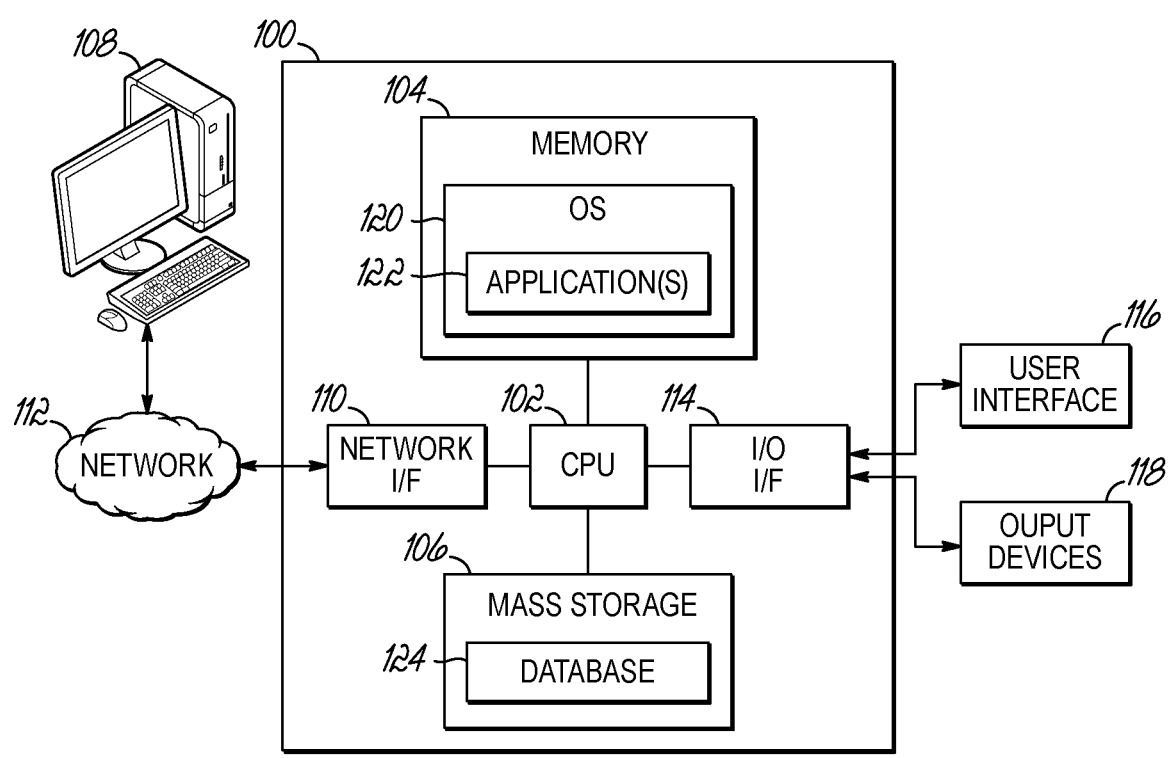
FIG. 17 is a diagrammatic illustration of a hardware and software environment for an apparatus that may be used to implement one or more controllers, structures, systems, and/or modes consistent with embodiments of the invention.

Referring now to FIG. 17, embodiments of the invention described above, or portions thereof, such as one or more controllers, or one or more aspects thereof, may be implemented using one or more computer devices or systems, such as exemplary computer 100. The computer 100 may include at least one central processing unit, or "processor" 102 coupled to a memory 104. The processor 102 may be implemented in hardware using circuit logic disposed on one or more physical integrated circuit devices or chips. The processor 102 may include one or more microprocessors, micro-controllers, field programmable gate arrays, or ASICs.

Memory 104 may include random access memory (RAM), dynamic random access memory (DRAM), static random access memory (SRAM), flash memory, and/or another digital storage medium, and may also be implemented using circuit logic disposed on one or more physical integrated circuit devices, or chips. Memory 104 may include memory storage physically located in the computer 100, e.g., such as a cache memory in the at least one processor 102, as well as any storage capacity used as a virtual memory, e.g., as stored on a mass storage device 106, another computer 108, coupled to computer 100 through a network interface 110 (network I/F) by way of at least one network 112.

The computer 100 may be coupled to one or more devices, sensors, actuators, controllers, etc. through an input/output interface 114 (I/O I/F). The processor 102 may also receive data from a user through a user interface 116 (including, for example, a keyboard, mouse, a microphone, and/or other user interface) and/or output data to the user or device through an output device 118 (including, for example, a display, speakers, a printer, and/or another output device). Moreover, in some embodiments, the I/O I/F 114 may communicate with a device that is operative as a user interface 116 and output device 118 in combination, such as a touch screen display.

The computer 100 may be under the control of an operating system 120 that executes or otherwise relies upon various computer software applications, sequences of operations, components, programs, files, objects, modules, etc., consistent with embodiments of the invention. In specific embodiments, the computer 100 may execute or otherwise rely on an application 122 to manage user and/or client data. Moreover, and in specific embodiments, the computer 100 may be configured with a database 124. Database 124 may be used to collect and organize data used by the various systems and modules described herein, and may include data and supporting data structures that store and organize the data.

The routines executed to implement the embodiments of the invention, whether implemented as part of an operating system or a specific application, component, program, object, module or sequence of instructions executed by one or more computing systems may be referred to herein as a "sequence of operations," a "program product," or, more simply, "program code." The program code typically comprises one or more instructions that are resident at various times in various memory and storage devices in a computing system, and that, when read and executed by one or more processors of the computing system, cause that computing system to perform the steps necessary to execute steps, elements, and/or blocks embodying the various aspects of the invention.

While the invention has been described in the context of fully functioning computing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others, and transmission type media such as digital and analog communication links.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A control system for a fixed-wing aircraft, the control system comprising:
   one or more processors; and
   a memory coupled to the one or more processors and including program code that, when executed by the one or more processors, causes the control system to:
   monitor a plurality of flight conditions of the aircraft, the flight conditions including a wind velocity vector;
   in response to the flight conditions being within a first threshold box defined by a first plurality of flight condition thresholds, activate a first multi-loop flight control mode including a plurality of control loops each having a respective nominal bandwidth;
   in response to one or more of the flight conditions exceeding one or more of the first plurality of flight condition thresholds, activate a second multi-loop flight control mode including the control loops in which each of the nominal bandwidths is multiplied by a bandwidth adaptation gain that decreases in response to an increase in a component of the wind velocity vector, and increases in response to a decrease in the component of the wind velocity vector; and
   control the aircraft using the activated flight control mode.

2. The control system of claim 1 wherein the first multi-loop flight control mode is a nominal flight control mode, the second multi-loop flight control mode is a loss-of-control prevention control mode, the first threshold box is a protection box, and the program code further causes the control system to:
   in response to the one or more of the flight conditions exceeding one or more of a second plurality of flight condition thresholds defining a safety box, activate a loss-of-control arrest control mode, and
   in response to the one or more of the fight conditions being within a third plurality of flight condition thresholds defining an operation box while either the loss-of-control prevention control mode or the loss-of-control arrest control mode is active, activate a nominal flight restoration control mode.

3. The control system of claim 2, wherein the nominal flight control mode implements a six degree-of-freedom trajectory tracking controller.

4. The control system of claim 2, wherein the loss-of-control arrest control mode includes a full throttle control during an arrest phase.

5. The control system of claim 2, wherein the loss-of-control arrest control mode includes a commanded aerodynamic attitude determined by a level and straight flight trim value of angle-of-attack and zero sideslip and bank angles.

6. The control system of claim 5, wherein the loss-of-control arrest control mode tracks the commanded aerodynamic attitude via inner and outer aerodynamic attitude loops.

7. The control system of claim 2, wherein the nominal flight restoration control mode includes a close-in sub-mode for guiding the aircraft to catch up with a target position dictated by a mission trajectory and a home-in sub-mode for restoring the mission trajectory of the aircraft.

8. The control system of claim 7, wherein the close-in sub-mode is defined by a guidance approach wherein a velocity vector of the aircraft is aligned to a line-of-sight vector of the aircraft using proportional-integral-derivative linear regulation in an Earth reference frame.

9. The control system of claim 7, wherein the home-in sub-mode includes a bandwidth adaptation for gradually regaining tracking performance of the aircraft and restoring the mission trajectory of the aircraft.

10. The control system of claim 1, wherein the second multi-loop flight control mode employs time-varying parallel differential eigenvalues to sacrifice tracking performance to increase a tolerance for severe wind in real-time.

11. The control system of claim 1 wherein the program code further causes the control system to:
set a value of a supervisory control logic variable according to the flight conditions of the aircraft; and
determine which flight control mode to activate based at least in part on the supervisory control logic variable.

12. The control system of claim 11, wherein the supervisory control logic variable is set to the value corresponding to a respective control mode in response to each flight condition of a set of flight conditions corresponding to the respective control mode being within a respective threshold of a set of thresholds corresponding to the respective control mode.

13. The control system of claim 12, wherein:
the supervisory control logic variable is set to the value corresponding to a nominal flight control mode in response to each flight condition of a corresponding set of flight conditions being within the respective threshold of a set of operation thresholds corresponding to the nominal flight control mode;
the supervisory control logic variable is set to the value corresponding to a loss-of-control prevention control mode in response to each flight condition of the corresponding set of flight conditions being within the respective threshold of a set of protection thresholds corresponding to the loss-of-control prevention control mode;
the supervisory control logic variable is set to the value corresponding to a loss-of-control arrest control mode in response to each flight condition of the corresponding set of flight conditions being within a respective safety threshold of a set of safety thresholds corresponding to the loss-of-control arrest control mode; and
the supervisory control logic variable is set to the value corresponding to a nominal flight restoration control mode in response to each flight condition of the corresponding set of flight conditions being within a respective operation threshold of the set of operation thresholds corresponding to the nominal flight restoration control mode.

14. The control system of claim 13, wherein the supervisory control logic variable is set to the value corresponding to the nominal flight restoration control mode when a predetermined set of flight conditions are each within a predetermined set of operation thresholds and a position error between the aircraft and a target position exceeds a range threshold.

15. A method of controlling a fixed-wing aircraft having an automatic a control system, the method comprising:
monitoring a plurality of flight conditions of the aircraft, the flight conditions including a wind velocity vector;
in response to the flight conditions being within a first threshold box defined by a first plurality of flight condition thresholds, activating a first multi-loop flight control mode including a plurality of control loops each having a respective nominal bandwidth;
in response to one or more of the flight conditions exceeding one or more of the first plurality of flight condition thresholds, activating a second multi-loop flight control mode including the control loops in which each of the nominal bandwidths is multiplied by a bandwidth adaptation gain that decreases in response to an increase in a component of the wind velocity vector, and increases in response to a decrease in the component of the wind velocity vector; and
controlling the aircraft using the activated flight control mode.

16. The method of claim 15 wherein the first multi-loop flight control mode is a nominal flight control mode, the second multi-loop flight control mode is a loss-of-control prevention control mode, the first threshold box is a protection box, and method further comprises:
in response to the one or more of the flight conditions exceeding one or more of a second plurality of flight condition thresholds defining a safety box, activating a loss-of-control arrest control mode, and
in response to the one or more of the fight conditions being within a third plurality of flight condition thresholds defining an operation box while either the loss-of-control prevention control mode or the loss-of-control arrest control mode is active, activating a nominal flight restoration control mode.

17. A computer program product for controlling a fixed-wing aircraft, the computer program product comprising:
a non-transitory computer-readable storage medium; and
program code stored on the non-transitory computer-readable storage medium that, when executed by one or more processors, causes the one or more processors to:
monitor a plurality of flight conditions of the aircraft, the flight conditions including a wind velocity vector;
in response to the flight conditions being within a first threshold box defined by a first plurality of flight condition thresholds, activate a first multi-loop flight control mode including a plurality of control loops each having a respective nominal bandwidth;
in response to one or more of the flight conditions exceeding one or more of the first plurality of flight condition thresholds, activate a second multi-loop flight control mode including the control loops in which each of the nominal bandwidths is multiplied by a bandwidth adaptation gain that decreases in response to an increase in a component of the wind velocity vector, and increases in response to a decrease in the component of the wind velocity vector; and
control the aircraft using the activated flight control mode.

* * * * *